(12) United States Patent
Kanazu

(10) Patent No.: US 8,597,839 B2
(45) Date of Patent: Dec. 3, 2013

(54) FUEL CELL SYSTEM

(75) Inventor: Naruto Kanazu, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 302 days.

(21) Appl. No.: 12/989,797

(22) PCT Filed: Jun. 11, 2009

(86) PCT No.: PCT/JP2009/060681
§ 371 (c)(1),
(2), (4) Date: Oct. 27, 2010

(87) PCT Pub. No.: WO2010/001702
PCT Pub. Date: Jan. 7, 2010

(65) Prior Publication Data
US 2011/0039173 A1   Feb. 17, 2011

(30) Foreign Application Priority Data

Jun. 30, 2008   (JP) ................................. 2008-170418

(51) Int. Cl.
*H01M 8/04* (2006.01)
(52) U.S. Cl.
USPC .......................................... 429/423; 429/428
(58) Field of Classification Search
USPC .......................................... 429/423, 428, 443
See application file for complete search history.

(56) References Cited

U.S. PATENT DOCUMENTS

| 5,928,805 | A   | * | 7/1999  | Singh et al. ................... 429/410 |
| 6,815,101 | B2  | * | 11/2004 | de Vaal et al. |
| 2003/0138688 | A1 | * | 7/2003  | Hattori et al. |
| 2008/0081231 | A1 |   | 4/2008  | Kurita et al. |
| 2008/0096068 | A1 |   | 4/2008  | Yamashita |
| 2008/0102331 | A1 |   | 5/2008  | Takada |
| 2008/0233442 | A1 |   | 9/2008  | Takada |

(Continued)

FOREIGN PATENT DOCUMENTS

| JP | 2001 351661 | 12/2001 |
| JP | 2002 8686   | 1/2002  |

(Continued)

OTHER PUBLICATIONS

International Search Report issued Sep. 29, 2009 in PCT/JP09/060681 filed Jun. 11, 2009.

(Continued)

*Primary Examiner* — Mark F Huff
*Assistant Examiner* — Monique Wills
(74) *Attorney, Agent, or Firm* — Oblon, Spivak, McClelland, Maier & Neustadt, L.L.P.

(57) ABSTRACT

A fuel cell system is provided with a fuel cell for supplying generated electric power to external power loads connected to a system power source, a reforming apparatus for supplying fuel gas generated by reforming unreformed fuel to the fuel cell, and a controller for controlling the operations of the fuel cell and the reforming apparatus. When having been unable to normally stop the fuel cell system due to the system power source falling in a power failure, the controller automatically executes a recovery operation so that the fuel cell system is brought into a restartable state, and upon completion of the recovery operation, brings the fuel cell system into a standby state. Thus, a normal restart subsequent to a power failure becomes possible without the need for human labor.

10 Claims, 15 Drawing Sheets

(56) References Cited

U.S. PATENT DOCUMENTS

| | | |
|---|---|---|
| 2008/0268309 A1 | 10/2008 | Takada |
| 2009/0026841 A1 | 1/2009 | Nakanishi |
| 2009/0087701 A1 | 4/2009 | Kuwaba |
| 2009/0136801 A1 | 5/2009 | Ohkawara |
| 2009/0226779 A1 | 9/2009 | Ohkawara |
| 2010/0239925 A1 | 9/2010 | Ohkawara et al. |

FOREIGN PATENT DOCUMENTS

| | | |
|---|---|---|
| JP | 2004 213944 | 7/2004 |
| JP | 2006 31995 | 2/2006 |
| JP | 2006 221836 | 8/2006 |
| JP | 2006 269196 | 10/2006 |
| JP | 2006 344408 | 12/2006 |
| JP | 2007 123007 | 5/2007 |
| JP | 2008 84730 | 4/2008 |
| JP | 2009 64673 | 3/2009 |
| JP | 2009 193936 | 8/2009 |

OTHER PUBLICATIONS

U.S. Appl. No. 12/867,844, filed Aug. 16, 2010, Shinoda, et al.
U.S. Appl. No. 12/988,462, filed Oct. 18, 2010, Shinoda, et al.

* cited by examiner

FUEL CELL SYSTEM

TECHNOLOGICAL FIELD

The present invention relates to a fuel cell system.

BACKGROUND ART

As one form of fuel cell systems, there has been known one which is described in Patent Document 1. As shown in FIG. 1 of Patent Document 1, in the fuel cell system 1, when a power supply to the fuel cell system 1 is recovered, the operation step is moved directly to a predetermined stopping stage which corresponds to respective steps right before the power supply to the fuel cell system 1 was discontinued, and that the fuel cell system 1 is then stopped through predetermined stopping steps subsequent thereto. Thus, it can be avoided that the main body of a fuel cell 20 and a reforming apparatus 10 are damaged due to deterioration of a catalyzer or the like.

PRIOR ART DOCUMENT

Patent Document

Patent Document 1: JP2006-31995 A

SUMMARY OF THE INVENTION

Problem to be Solved by the Invention

In the fuel cell system described in the aforementioned Patent Document 1, because in the case of a power failure occurring, the fuel cell system is moved to a stopping stage without taking account of fluctuations in pressure and temperature of the fuel cell system and is stopped through predetermined stopping steps, an unusually high temperature occurs to continue at predetermined places in the fuel cell system or places in an improper pressure state occur, so that there arises an anxiety that the system cannot be stopped in a restartable state. In addition, there arises another anxiety that maintenance by human is needed in executing the restart.

The present invention has been made for solving the aforementioned problems, and an object thereof is to be able to make a restart without a need for maintenance by human in executing a restart subsequent to a power failure in a fuel cell system.

Measures for Solving the Problems

In order to solve the aforementioned problems, the structural feature of the invention according to a first aspect resides in a fuel cell system which comprises a fuel cell for supplying generated electric power to external power loads connected to a system power source; a reforming apparatus for supplying fuel gas generated by reforming unreformed fuel to the fuel cell; and a controller for controlling operations of the fuel cell and the reforming apparatus, wherein when having been unable to normally stop the fuel cell system at the time of the system power source being abnormal, the controller automatically executes a recovery operation so that the fuel cell system is brought into a restartable state, and upon completion of the recovery operation, brings the fuel cell system into a standby state.

The structural feature of the invention according to a second aspect resides in that in the first aspect, the reforming apparatus is provided with a reforming section for reforming unreformed fuel to generate fuel gas and a burner section supplied with combustible gas and combustion oxidizer gas for combusting the combustible gas with the combustion oxidizer gas to heat the reforming section with combustion gas and that the recovery operation includes a cooling processing for the burner section and a heat medium circulation circuit and a pressure regulation processing for respective interiors of the reforming apparatus and the fuel cell.

The structural feature of the invention according to a third aspect resides in that in the second aspect, the pressure regulation processing is executed upon completion of the cooling processing.

The structural feature of the invention according to a fourth aspect resides in that in the second or third aspect, the fuel cell system is further provided with a first heat medium circulation circuit through which first heat medium for collecting waste heat of the reforming apparatus circulates, and first heat medium circulation means for circulating the first heat medium; that the waste heat of the reforming apparatus also includes waste heat of exhaust gas from the burner section; and that the cooling processing is a processing for flowing the combustion oxidizer gas only into the burner section after the circulation operation of the first heat medium by the first heat medium circulation means is started.

The structural feature of the invention according to a fifth aspect resides in that in any one of the first through fourth aspects, during the recovery operation, the controller detects an abnormality in the fuel cell system including at least one of faults of sensors provided in the fuel cell system, leaks of unreformed fuel, combustible gas and fuel gas, a fire in the fuel cell system and an unusually high temperature in the fuel cell system, and upon detection of the abnormality, inhibits the restart of the fuel cell system.

The structural feature of the invention according to a sixth aspect resides in that in the fifth aspect, when the temperature at a predetermined place in the fuel cell system rises higher than a predetermined temperature, the controller judges the occurrence of an unusually high temperature if the high temperature state lasts for a predetermined time period or longer.

The structural feature of the invention according to a seventh aspect resides in that in any one of the first through sixth aspects, the controller stores the number of stopping operations having been executed due to abnormalities of the system power source and the number of recovery operations having been executed from the abnormalities and inhibits a further recovery operation from an a presently occurring abnormality if either of the numbers reaches a predetermined number.

Effects of the Invention

In the invention according to the first aspect as constructed above, when having been unable to normally stop the fuel cell system at the time of the system power source being abnormal, the controller automatically executes the recovery operation so that the fuel cell system is brought into a restartable state, and brings the fuel cell system into the standby state upon completion of the recovery operation. Thus, where the fuel cell system has not been normally stopped at the time of the system power source being abnormal, even if an unusually high temperature occurs to continue at a predetermined place in the fuel cell system or even if a place in an improper pressure state occurs, the fuel cell system is automatically recovered to be brought into the restartable state and is moved to the standby state upon completion of the recovery. Thus, at the time of a subsequent restart, it is possible to normally restart the fuel cell system without a need for maintenance by human.

In the invention according to the second aspect as constructed above, the reforming apparatus in the first aspect is provided with the reforming section for reforming unreformed fuel to generate fuel gas and the burner section supplied with combustible gas and combustion oxidizer gas for combusting the combustible gas with the combustion oxidizer gas to heat the reforming section with the combustion gas, and the recovery operation includes the cooling processing for the burner section and the heat medium circulation circuit and the pressure regulation processing for the respective interiors of the reforming apparatus and the fuel cell. Thus, even if an unusually high temperature occurs to continue at the predetermined place in the fuel cell system or the place in an improper pressure state occurs in the case that the fuel cell system has not been normally stopped at the time of the system power source being abnormal, the cooling processing can suppress the high temperature and the pressure regulation processing can prevent the pressure becoming improper. Therefore, the system can, as a whole, be restrained from deteriorating in performance and durability and can be maintained high in reliability.

In the invention according to the third aspect as constructed above, the pressure regulation processing in the invention according to the second aspect is executed upon completion of the cooling processing. Thus, since the pressure regulations in the interiors of the reforming apparatus and the fuel cell are carried out after the burner section of the reforming apparatus has gone down in temperature, any accidental ignition can be prevented even if the combustible gases such as unreformed fuel and fuel gas in the interiors flow as a result of the pressure regulations.

In the invention according to the fourth aspect as constructed above, the fuel cell system in the invention according to the second or third aspect is further provided with the first heat medium circulation circuit through which the first heat medium for collecting the waste heat from the reforming apparatus circulates, and the first heat medium circulation means for circulating the first heat medium, the waste heat from the reforming apparatus also includes the waste heat of the exhaust gas from the burner section, and the cooling processing is the processing for flowing combustion oxidizer gas only into the burner section after the circulation operation of the first heat medium by the first heat medium circulation means is started. Thus, since, when the first heat medium collects the waste heat of the exhaust gas from the burner section in connection with the cooling of the burner section through circulation of the combustion oxidizer gas, the waste heat of the exhaust gas can be collected by the first heat medium having been already circulating, the first heat medium can be prevented from being boiled with the waste heat of the exhaust gas, so that the recovery operation can be performed normally.

In the invention according to the fifth aspect as constructed above, during the recovery operation, the controller in the invention according to any one of the first through fourth aspects detects an abnormality in the fuel cell system including at least one of faults of the sensors provided in the fuel cell system, leaks of unreformed fuel, combustible gas and fuel gas, a fire in the fuel cell system and an unusually high temperature in the fuel cell system, and upon detection of the abnormality, inhibits the restart of the fuel cell system. Thus, it is possible to restore the system normally in the recovery operation.

In the invention according to the sixth aspect as constructed above, when the temperature at the predetermined place in the fuel cell system rises higher than the predetermined temperature, the controller in the invention according to the fifth aspect judges the occurrence of an unusually high temperature if the high temperature states lasts for the predetermined time period or longer. Thus, it is possible to suppress an erroneous detection regarding an unusually high temperature at the time of a normal operation.

In the invention according to the seventh aspect as constructed above, the controller in the invention according to any one of the first through sixth aspects stores the number of stopping operations having been executed due to abnormalities of the system power source and the number of recovery operations having been executed from the abnormalities and inhibits a further recovery operation from a presently occurring abnormality if either of the numbers reaches the predetermined number. Thus, the executions of further recovery operations and further restarts which are unreasonable or useless can be suppressed, so that it is possible to restore the system normally.

FORM FOR PRACTICING THE INVENTION

Figure 1:
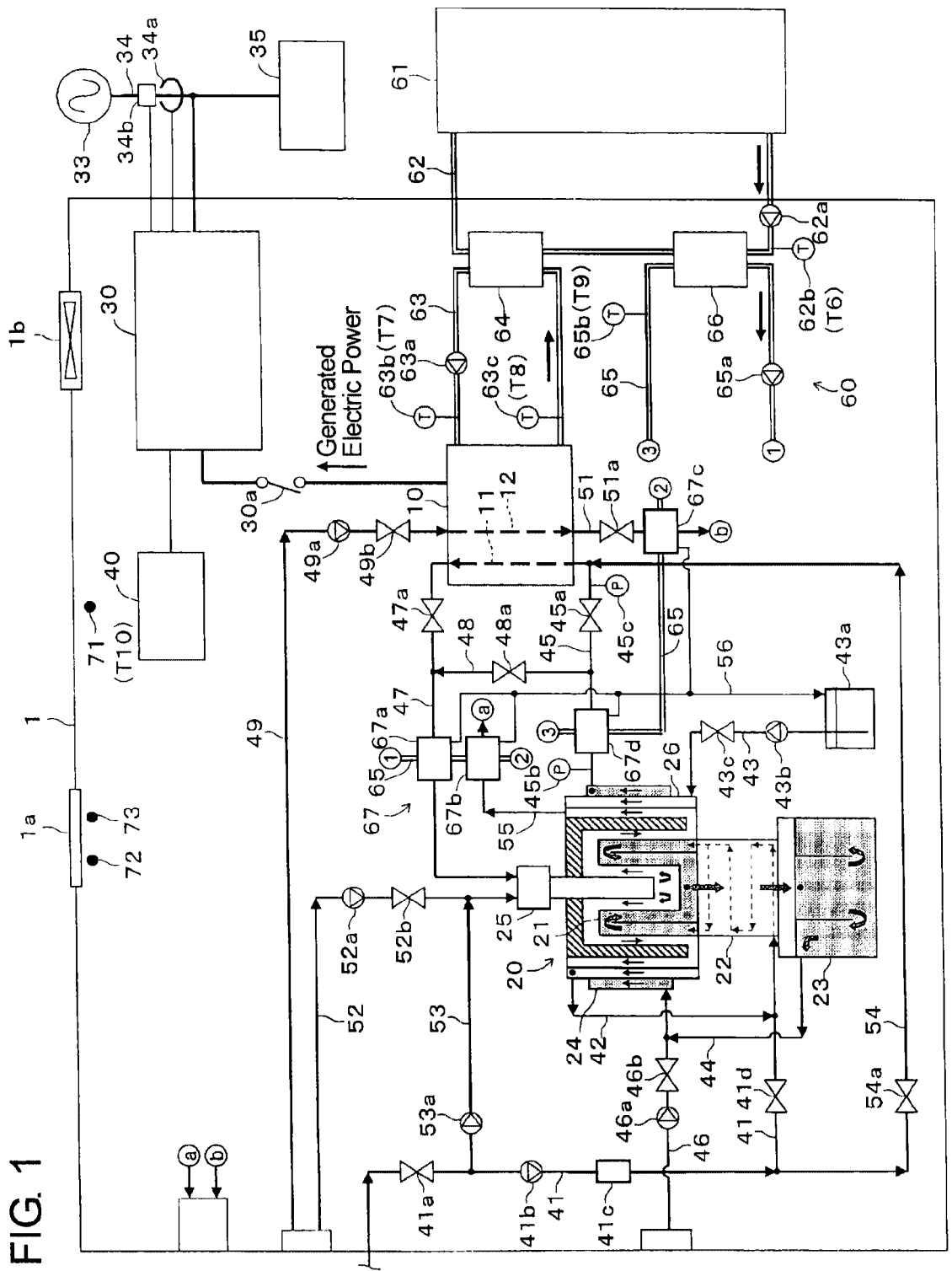
FIG. 1 is a schematic view showing the outline of one embodiment of a fuel cell system according to the present invention.
Figure 2:
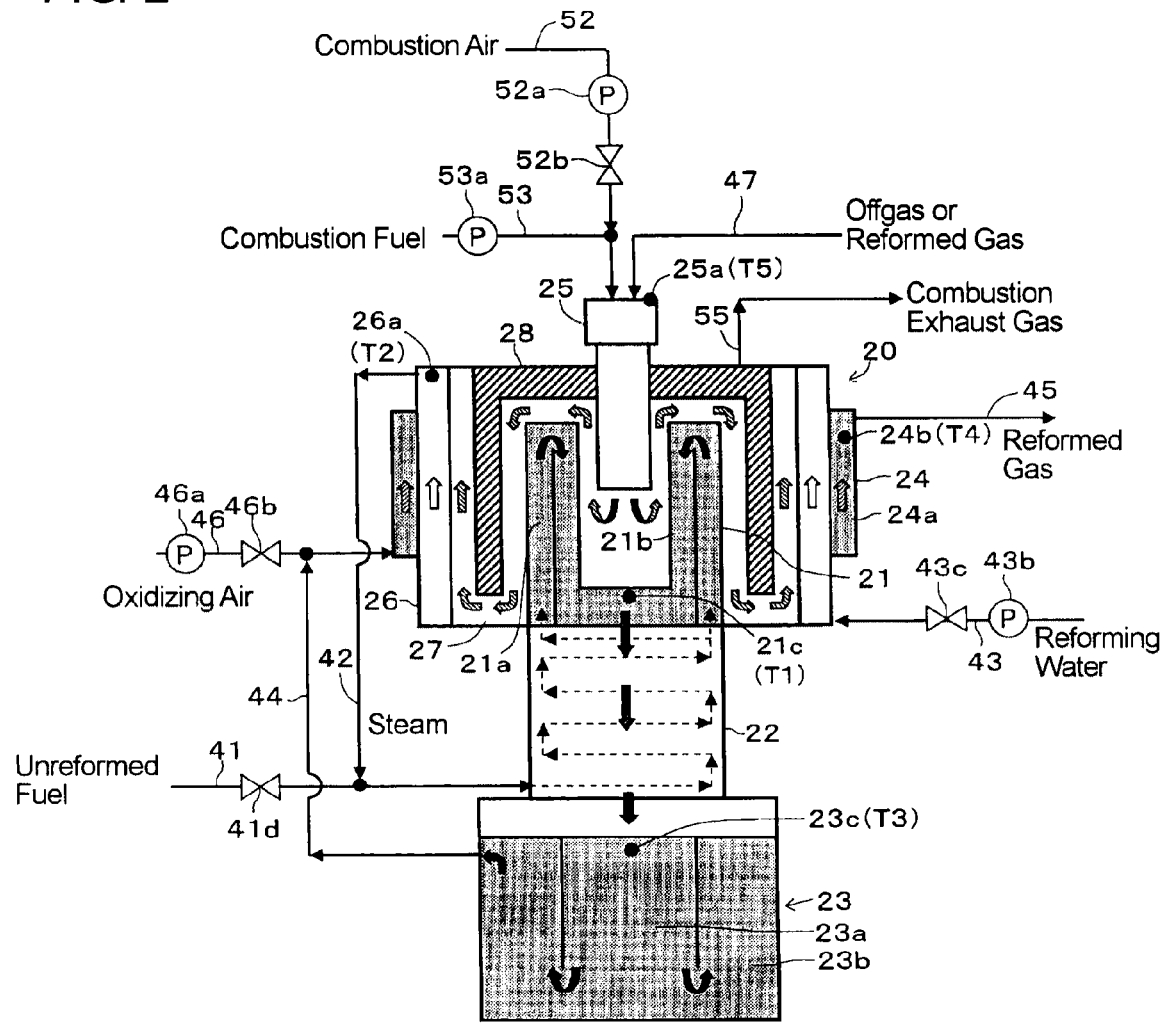
FIG. 2 is a block diagram showing a reforming apparatus shown in FIG. 1 and peripheries thereof.
Figure 3:
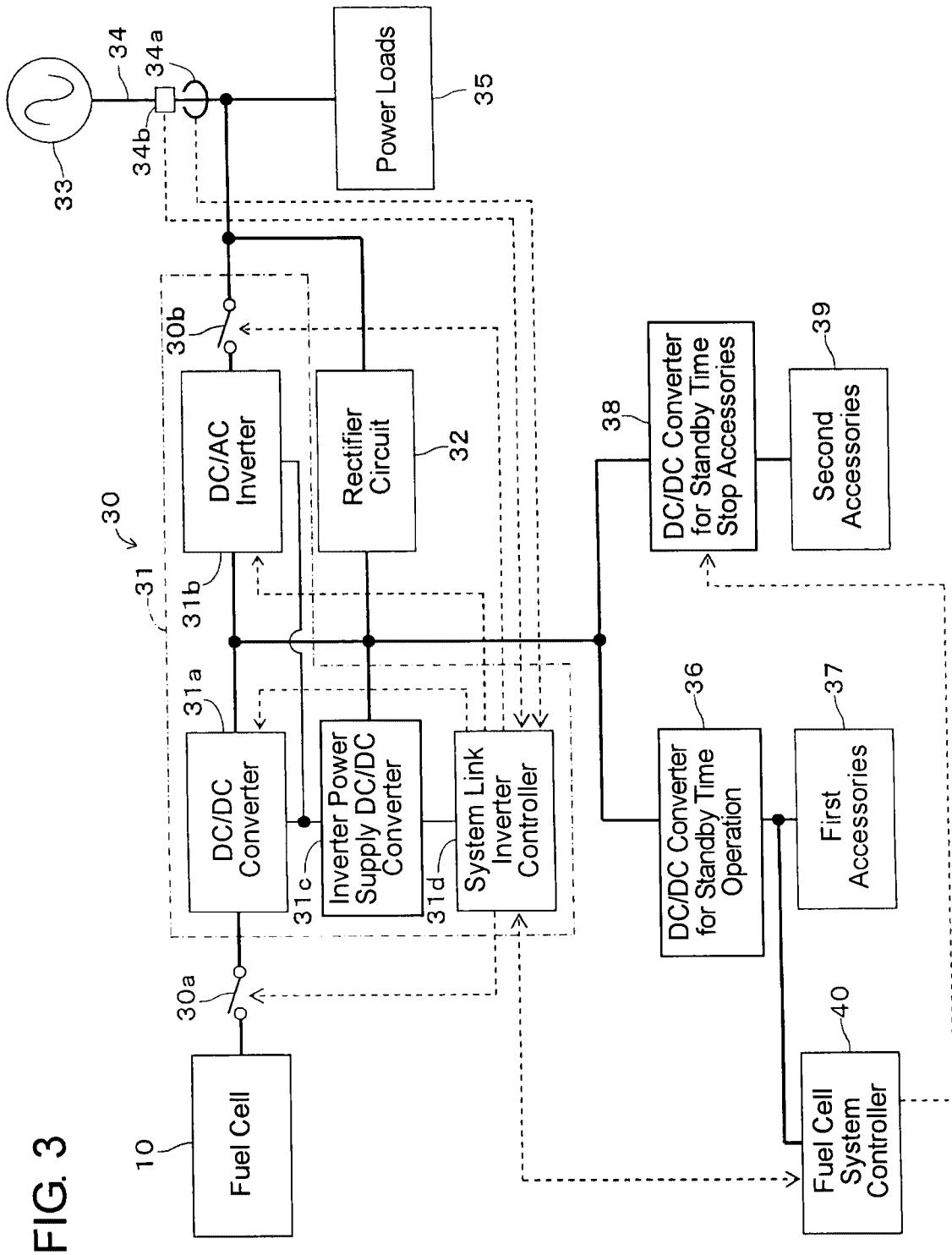
FIG. 3 is a block diagram showing an inverter system shown in FIG. 1 and peripheries thereof.
Figure 4:
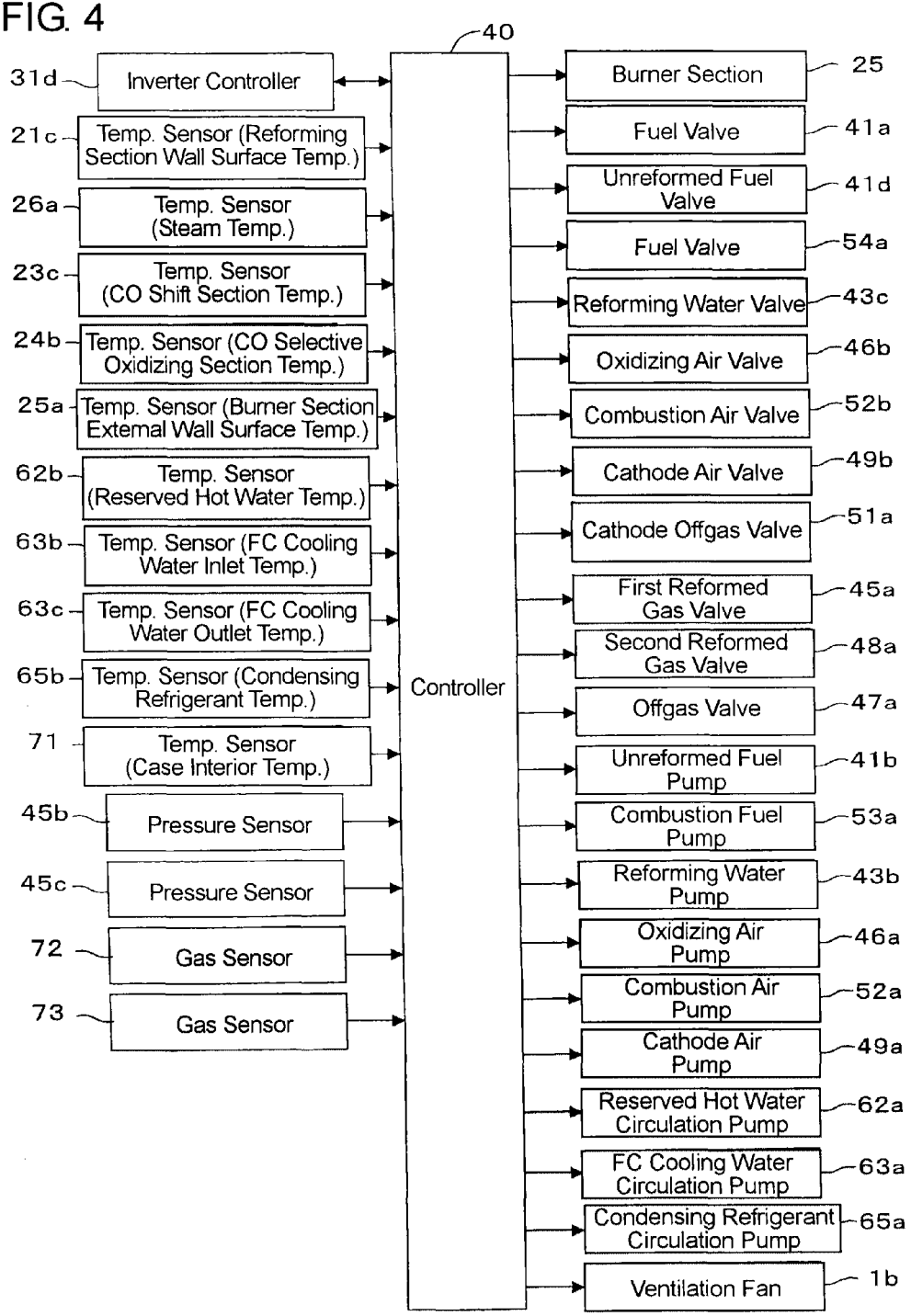
FIG. 4 is a block diagram showing the fuel cell system shown in FIG. 1.
Figure 5:
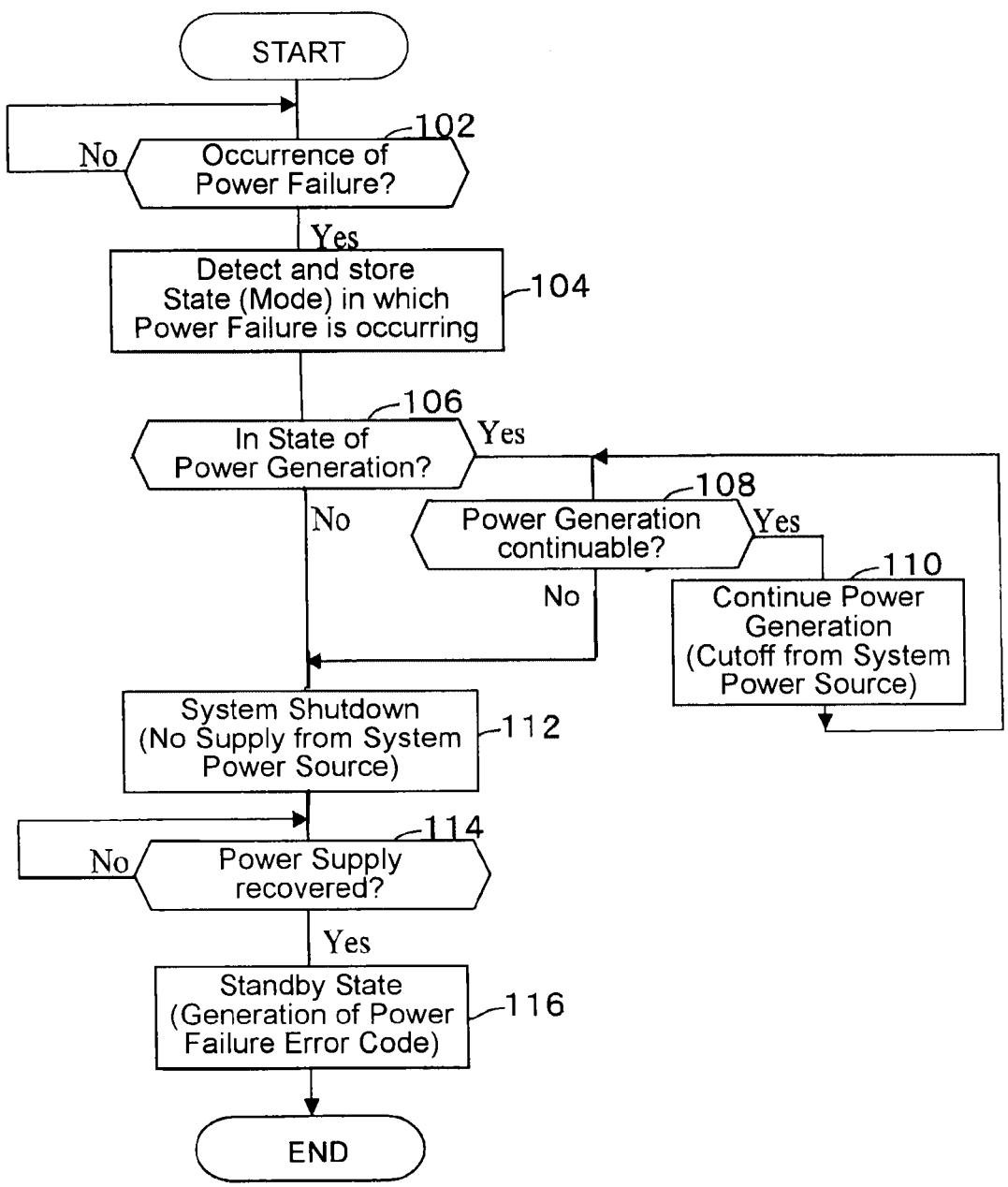
FIG. 5 is a flow chart of a control program executed by a controller shown in FIG. 1.
Figure 6:
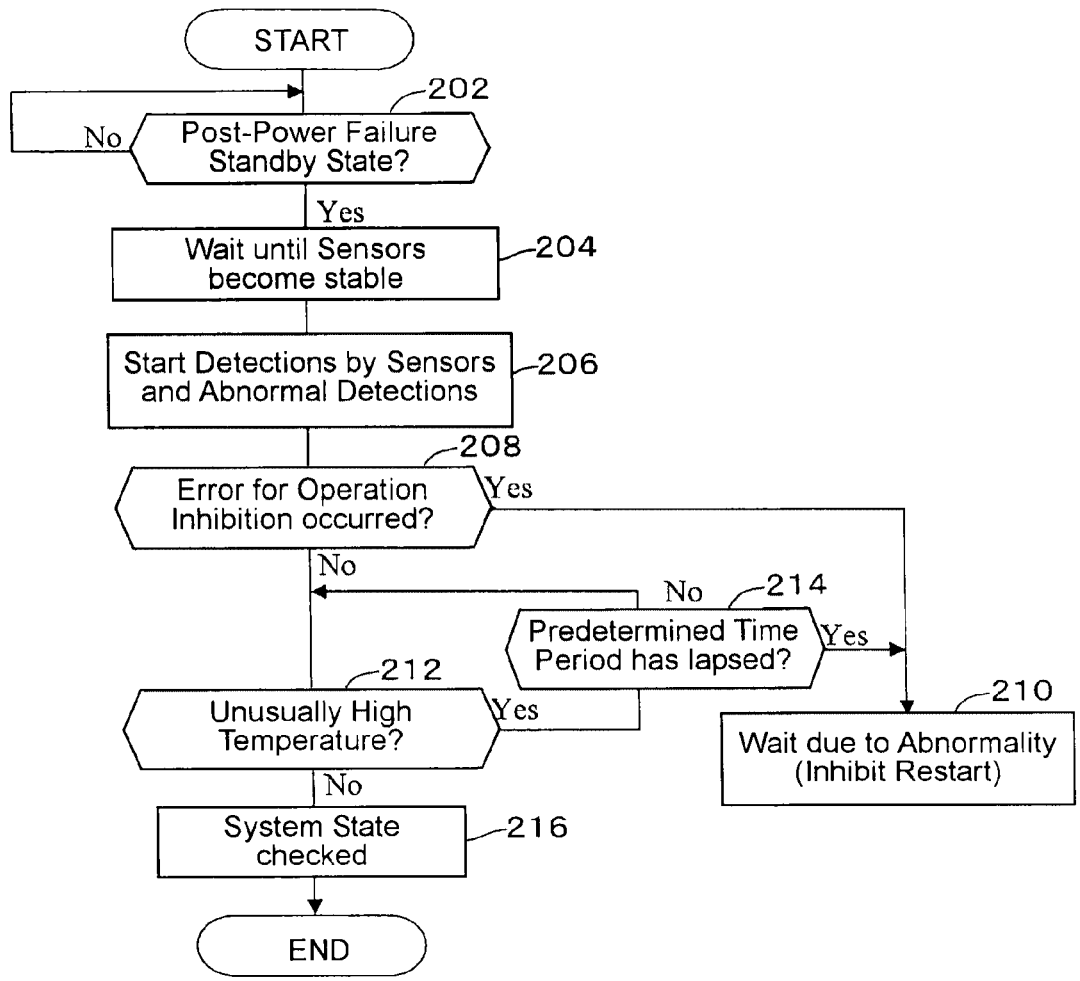
FIG. 6 is a flow chart of a control program executed by the controller shown in FIG. 1.
Figure 7:
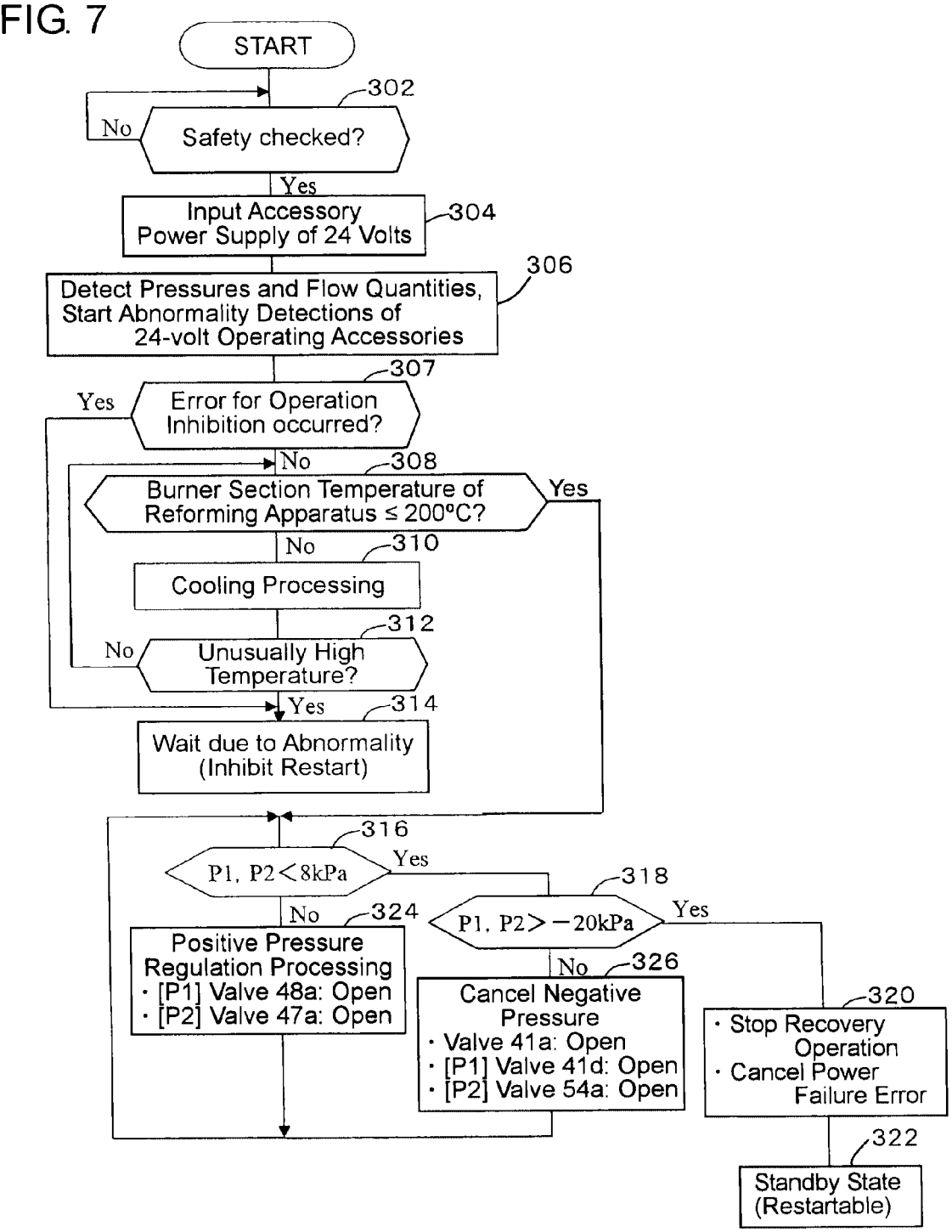
FIG. 7 is a flow chart of a control program executed by the controller shown in FIG. 1.

Hereafter, one embodiment of a fuel cell system according to the present invention will be described with reference to the drawings. FIG. 1 is a schematic view showing the outline of the fuel cell system, FIG. 2 is a schematic view showing the construction of a reforming apparatus, FIG. 3 is a block diagram showing an electric system including an inverter system, and FIG. 4 is a block diagram showing the fuel cell system.

As shown in FIG. 1, the fuel cell system is provided with a fuel cell 10, the reforming apparatus 20, the inverter system 30, a fuel cell system controller (hereafter referred to as system controller) 40, and a waste heat collection system 60.
1) Fuel Cell The fuel cell 10 is provided with a fuel electrode 11, an air electrode 12 being an oxidizer electrode and is operable to generate electric power by using reformed gas supplied to the fuel electrode 11 and air (cathode air) being oxidizer gas supplied to the air electrode 12. Instead of air, there may be supplied oxygen-rich air gas.
2) Reforming Apparatus As shown in FIG. 2, the reforming apparatus 20 is for reforming unreformed fuel with steam to supply hydrogen-rich reformed gas (fuel gas) to the fuel cell 10 and is composed of a reforming section 21, a cooler section 22, a carbon monoxide shift reaction section (hereafter referred to as CO shift section) 23, a carbon monoxide selective oxidation reaction section (hereafter referred to as CO selective oxidizing section) 24, a burner section 25, and an evaporator section 26. As the unreformed fuel, there may be employed unreformed gaseous fuel such as natural gas, LPG or the like or unreformed liquid fuel such as kerosene, gasoline, methanol or the like. The present embodiment will be described in the form using natural gas.

The reforming section 21 generates and derives reformed gas from a mixture gas as unreformed raw material in which reforming water is mixed with unreformed fuel. The reforming section 21 takes a bottomed cylindrical form and is provided in an annular cylinder with an annular turnover flow passage 21a extending along the axis of the annular cylinder.

Catalyzer 21b (e.g., Ru or Ni base catalyzer) is filled in the turnover flow passage 21a of the reforming section 21, in which a mixture gas of unreformed fuel and steam supplied from the cooler section 22 reacts through the catalyzer 21b and is reformed to generate hydrogen gas and carbon monoxide gas (a so-called steam reforming reaction). At the same time, there takes place a so-called carbon monoxide shift reaction wherein the carbon monoxide, generated through the steam reforming reaction, and steam react to be metamorphosed into hydrogen gas and carbon dioxide. The generated gases (so-called reformed gases) are discharged to the cooler section (heat exchanger section) 22. The steam reforming reaction is an endothermic reaction, whereas the carbon monoxide shift reaction is an exothermic reaction. The active temperature range of the catalyzer 21b in the reforming section 21 is from 400° C. to 800° C. So far as the temperature of the reforming section 21 is in the active temperature range of the catalyzer 21b, much more hydrogen is generated at a higher temperature.

Further, the reforming section 21 is provided therein with a temperature sensor 21c for measuring the temperature in the reforming section 21 such as, e.g., the temperature (T1) around a wall which is adjacent to the burner section 25. The temperature T1 detected by the temperature sensor 21c indicates an interior temperature of the burner section 25. The detection result of the temperature sensor 21c is transmitted to the system controller 40.

The cooler section 22 is a heat exchanger (heat exchange section) for performing heat exchange between the reformed gas discharged from the reforming section 21 and the mixture gas of unreformed fuel and reforming water (steam). The cooler section 22 lowers the temperature of the high-temperature reformed gas with the low-temperature mixture gas to discharge the reformed gas to the CO shift section 23 while raising the temperature of the mixture gas with the reformed gas to discharge the mixture gas to the reforming section 21.

Specifically, the cooler section 22 has connected thereto an unreformed fuel supply pipe 41 which is connected to a fuel supply source (e.g., a city gas pipe), not shown. As shown in FIG. 1, the unreformed fuel supply pipe 41 is provided thereon with a fuel valve 41a, an unreformed fuel pump 41b, a desulfurizer 41c and an unreformed fuel valve 41d in order from the upstream side. The fuel valve 41a and the unreformed fuel valve 41d operate to open or close the unreformed fuel supply pipe 41. The unreformed fuel pump 41b is unreformed fuel supply means for supplying unreformed fuel and for regulating the supply quantity. The desulfurizer 41c is for eliminating sulphur content (e.g., sulphur compound) in the fuel. Of the fuel, one which is supplied to the reforming section 21 to be reformed is called unreformed fuel, while one which is supplied directly to the burner section 25 to be burned is called combustion fuel.

A steam supply pipe 42 connected to the evaporator section 26 is connected between the unreformed fuel valve 41d on the unreformed fuel supply pipe 41 and the cooler section 22. The steam supplied from the evaporator section 26 is mixed with unreformed fuel, and the mixture gas is supplied to the reforming section 21 by way of the cooler section 22.

As shown in FIG. 2, the evaporator section 26 is for generating steam by evaporating reforming water to supply the steam to the reforming section 21 through the cooler section 22. The evaporator section 26 takes a cylindrical shape and is provided to cover and contact an outer circumferential wall of a combustion gas flow passage 27.

A feedwater pipe 43 connected to a reforming water tank 43a is connected to a lower part (e.g., a lower part of a side wall surface or a bottom surface) of the evaporator section 26. An upper part (e.g., an upper part of the side wall surface) of the evaporator section 26 is connected to the steam supply pipe 42. Reforming water led from the reforming water tank 43a is heated by the heat from the combustion gas and the heat from the CO selective oxidizing section 24 in the course of flowing through the evaporator section 26 and turns to steam to be discharged to the reforming section 21 through the steam supply pipe 42 and the cooler section 22. The feedwater pipe 43 is provided thereon with a reforming water pump 43b and a reforming water valve 43c in turn from the upper steam side. The reforming water pump 43b is for supplying reforming water to the evaporator section 26 and for regulating the supply quantity. The reforming water valve 43c is for opening and closing the feedwater pipe 43.

Further, the evaporator section 26 is provided with a temperature sensor 26a for detecting the temperature of the steam in the evaporator section 26. The detection result of the temperature sensor 26a is transmitted to the system controller 40.

If it is possible to detect the temperature of the steam, the temperature sensor 26a may be provided at around the inlet of the cooler section 22 or on the steam supply pipe 42 between the evaporator section 26 and the cooler section 22. The temperature (T2) of the steam is the temperature of the reforming water supplied to the reforming section 21.

The CO shift section 23 is one for reducing carbon monoxide in the reformed gas supplied from the reforming section 21 by way of the cooler section 22, that is, is a carbon monoxide reduction section. The CO shift section 23 is provided therein with a turnover flow passage 23a extending in a vertical direction. The turnover flow passage 23a is filled with catalyzer 23b (e.g., Cu—Zn base catalyzer). In the CO shift section 23, a so-called carbon monoxide shift reaction takes place, in which the carbon monoxide and the steam contained in the reformed gas supplied from the cooler section 22 react through the catalyzer 23b to be metamorphosed into hydrogen gas and carbon dioxide gas. This carbon monoxide shift reaction is an exothermic reaction.

Further, the CO shift section 23 is provided therein with a temperature sensor 23c for measuring the temperature (T3) in the CO shift section 23. The detection result of the temperature sensor 23c is transmitted to the system controller 40.

The CO selective oxidizing section 24 is one for further reducing the carbon monoxide in the reformed gas supplied from the CO shift section 23 to supply the reformed gas to the fuel cell 10, that is, is a carbon monoxide reduction section. The CO selective oxidizing section 24 takes an annular cylindrical form and is provided in contact with the outer circumferential wall of the evaporator section 26 to cover the outer circumferential wall. The CO selective oxidizing section 24 is filled therein with catalyzer 24a (e.g., Ru or Pt base catalyzer).

Further, the CO selective oxidizing section 24 is provided therein with a temperature sensor 24b for measuring the temperature (T4) in the CO selective oxidizing section 24. The detection result of the temperature sensor 24b is transmitted to the system controller 40.

The CO selective oxidizing section 24 is connected at lower and upper portions of its lateral wall surface respectively to a connection pipe 44 connected to the CO shift section 23 and a reformed gas supply pipe 45 connected to the fuel electrode 11 of the fuel cell 10. The connection pipe 44 has an oxidizing air supply pipe 46 connected thereto. Thus, the CO selective oxidizing section 24 can be supplied with the reformed gas from the CO shift section 23 and oxidizing air from the atmosphere. The oxidizing air supply pipe 46 is provided thereon with an oxidizing air pump 46a and an oxidizing air valve 46b in order from the upstream side. The oxidizing air pump 46a is for supplying oxidizing air and for regulating the supply quantity. The oxidizing air valve 46b operates to open or close the oxidizing air supply pipe 46.

Accordingly, the carbon monoxide in the reformed gas led to the CO selective oxidizing section 24 reacts to (is oxidized with) oxygen in the oxidizing air to turn to carbon dioxide. This reaction is an exothermic reaction and is expedited by the catalyzer 24a. Thus, the reformed gas is derived with the density of carbon monoxide reduced further (to less than 10 ppm) through oxidation reaction and is supplied to the fuel electrode 11 of the fuel cell 10.

As shown in FIG. 1, the fuel electrode 11 of the fuel cell 10 is connected at its inlet port to the CO selective oxidizing section 24 through the reformed gas supply pipe 45 and at its outlet port to the burner section 25 through an offgas supply pipe 47. A bypass pipe 48 bypasses the fuel cell 10 to make direct connection between the reformed gas supply pipe 45 and the offgas supply pipe 47. The reformed gas supply pipe 45 is provided thereon with a first reformed gas valve 45a between a branched point to the bypass pipe 48 and the fuel cell 10. The offgas supply pipe 47 is provided thereon with an offgas valve 47a between a merging point with the bypass pipe 48 and the fuel cell 10. The bypass pipe 48 is provided with a second reformed gas valve 48a thereon.

The reformed gas supply pipe 45 is provided with two pressure sensors 45b, 45c thereon. The pressure sensor 45b is for detecting the pressure of reformed gas at a reforming apparatus outlet port, and hence, the internal pressure of the reforming apparatus 20 which is sealed during a standby state or the like. The pressure sensor 45c is for detecting the pressure of reformed gas at a fuel cell inlet port, and hence, the internal pressure of the fuel cell 10 which is sealed during a standby state or the like. The detection results from the pressure sensors 45b, 45c are transmitted to the system controller 40.

The air electrode 12 of the fuel cell 10 is connected to a cathode air supply pipe 49 at its inlet port and to a cathode offgas exhaust pipe 51 at its outlet port. The air electrode 12 is supplied with air, and offgas is exhausted. The cathode air supply pipe 49 is provided thereon with a cathode air pump 49a and a cathode air valve 49b in order from the upstream side. The cathode air pump 49a is for supplying cathode air and for regulating the supply quantity. The cathode air valve 49b operates to open or close the cathode air supply pipe 49. Further, the cathode offgas exhaust pipe 51 is provided with a cathode offgas valve 51a thereon. The cathode offgas valve 51a operates to open or close the cathode offgas exhaust pipe 51.

The burner section 25 is for generating combustion gas which heats the reforming section 21 to supply heat necessary for the steam reforming reaction, and is arranged with its lower end portion being inserted inside of an inner circumferential wall of the reforming section 21 and being spaced from the inner circumferential wall. The burner section 25 is provided with an ignition electrode (not shown), which is ignited in response to a command from the system controller 40. The burner section 25 is configured to be supplied with combustible gas such as combustion fuel, anode offgas and reformed gas as well as with oxidizer gas such as combustion air for burning (oxidizing) the combustible gas.

Specifically, as shown in FIGS. 1 and 2, the burner section 25 is connected to the other end of the offgas supply pipe 47 which is connected at one end to the outlet port of the fuel electrode 11. The burner section 25 is supplied with the reformed gas from the reforming apparatus 20 through the reformed gas supply pipe 45, the bypass pipe 48 and the offgas supply pipe 47 at the time of a starting operation of the fuel cell system (reforming apparatus 20) and is also supplied with the anode offgas (unreformed fuel not reformed in the reforming section 21 or the hydrogen-containing reformed gas not consumed at the fuel electrode 11) exhausted from the fuel cell 10 at the time of a power generation operation of the fuel cell system (reforming apparatus 20).

Further, the burner section 25 is connected to a combustion air supply pipe 52 and is supplied with combustion air being combustion oxidizer gas for burning combustion fuel, reformed gas or anode offgas. The combustion air supply pipe 52 is provided thereon with a combustion air pump 52a and a combustion air valve 52b. The combustion air pump 52a is for drawing combustion air from the atmosphere to supply the combustion air to the burner section 25 as well as for regulating the supply quantity of combustion air supplied to the burner section 25. The combustion air valve 52b operates to open or close the combustion air supply pipe 52.

Further, between the fuel valve 41a and the unreformed fuel pump 41b, the unreformed fuel supply pipe 41 is connected to the other end of a combustion fuel supply pipe 53 whose one end is connected to the combustion air supply pipe 52 between the burner section 25 and the combustion air valve 52b. The combustion fuel supply pipe 53 is provided with a combustion fuel pump 53a thereon. The combustion fuel pump 53a is for supplying combustion fuel and for regulating the supply quantity.

Between the desulfurizer 41c and the unreformed fuel pump 41d, the unreformed fuel supply pipe 41 is connected to the other end of a fuel supply pipe 54 whose one end is connected to the reformed gas supply pipe 45 between the fuel cell 10 and the first reformed gas valve 45a. The fuel supply pipe 54 is provided with a fuel valve 54a thereon. The fuel valve 54a operates to open or close the fuel supply pipe 54. The fuel supply pipe 54 is a pipe for hermetically sealing the fuel cell 10 (fuel electrode 11) with raw fuel (the aforementioned unreformed fuel) or for purging the fuel cell 10 with the raw fuel. In the case of a system that does not need the fuel supply pipe 54, raw fuel is introduced from the reforming apparatus 20 by bringing the valves 41a, 41d and 45a into the open state.

In the burner section 25, during the period from the time at which the system starting begins to the time at which the supply of unreformed fuel to the reforming section 21 is started, the combustion air valve 52b is opened and the combustion air pump 52a is driven. Thus, combustion air is supplied to the burner section 25. Further, the unreformed fuel valve 41d, the first reformed gas valve 45a, the offgas valve 47a and the fuel valve 54a are closed, simultaneously with which the fuel valve 41a is opened and the combustion fuel pump 53a is driven. Thus, combustion fuel is supplied to the burner section 25 through the unreformed fuel supply pipe 41, the combustion fuel supply pipe 53 and the combustion air supply pipe 52 without passing through the reforming section 21. Accordingly, combustion fuel and combustion air are premixed to be supplied to the burner section 25, in which a premixed combustion is performed.

Further, during the period from the time subsequent to the starting of the supply of unreformed fuel to the reforming section 21 to the time of the starting of power generation, the unreformed fuel valve 41d and the second reformed gas valve 48a are opened, the driving of the combustion fuel pump 53a is stopped, and the unreformed fuel pump 41b is driven. The fuel valve 54a, the first reformed gas valve 45a and the offgas valve 47a remain closed. Thus, in order to avoid that reformed gas being high in density of carbon monoxide is supplied from the CO selective oxidizing section 24 to the fuel cell 10, the reformed gas from the CO selective oxidizing section 24 is supplied to the burner section 25 through the reformed gas supply pipe 45, the bypass pipe 48 and the offgas supply pipe 47 without passing through the fuel cell 10. Further, the supply of the combustion air to the burner section 25 is continued. Accordingly, a diffusion combustion is performed with the reformed gas and the combustion air being independently supplied to the burner section 25.

Then, during the power generation operation, the unreformed fuel valve 41d, the first reformed gas valve 45a and the offgas valve 47a are opened, while the second reformed gas valve 48a is closed and the unreformed fuel pump 41b is driven. Thus, the anode offgas (the reformed gas which includes hydrogen and unreformed fuel as a result of being supplied to the fuel electrode 11 of the fuel cell 10, but being exhausted without being consumed therein) from the fuel electrode 11 of the fuel cell 10 is supplied to the burner section 25. At this time, in the burner section 25, there is not being performed a reheating that combustible gas such as unreformed fuel is separately added to be burnt. This is a so-called "reheatingless". Further, the supply of combustion air to the burner section 25 goes on. Accordingly, a diffusion combustion is carried out with the anode offgas and the combustion air being independently supplied to the burner section 25.

In this way, in the combustion section 25, the combustion fuel, the reformed gas or the anode offgas (these are combustible gases) supplied to the burner section 25 is burned with the combustion air supplied to the burner section 25 to generate combustion gas being a high temperature. This combustion gas flows through the combustion gas flow passage 27 which is formed between the reforming section 21 and a heat insulator section 28 and between the heat insulator section 28 and the evaporator section 26 and which is arranged to heat the reforming section 21 and the evaporator section 26, and passes through a combustion gas exhaust pipe 55 to be exhausted outside as combustion exhaust gas. The combustion gas heats the reforming catalyzer 21b in the reforming section 21 to the activation temperature range and heats the evaporator section 22 26 for generation of steam.

On the surface which is the outer wall surface of the burner section 25 and which is also the outer wall of the reforming apparatus 20, there is provided a temperature sensor 25a for measuring the outer wall surface temperature of the burner section 25. The detection result of the temperature sensor 25a is transmitted to the system controller 40.

3) Inverter System

As shown in FIG. 3, an inverter system 30 is provided with an inverter unit 31 and a rectifier circuit 32. The inverter unit 31 has a first function of converting direct current voltage outputted from the fuel cell 10 into predetermined alternating current voltage to output the alternating current voltage to power lines 34 connected to a system power source 33, a second function of converting alternating current voltage from the power lines 34 into predetermined direct current voltage to output the direct current voltage to first and second accessories 37, 39, and a third function of converting the direct current voltage from the fuel cell 10 into predetermined direct current voltage to output the direct current voltage to the first and second accessories 37, 39.

The system power source (or commercial power supply) 33 supplies electric power to external power loads 35 through the power lines 34 connected to the system power source 33. The fuel cell 10 is connected to the power lines 34 through the inverter unit 31.

The first accessories 37 are first power loads which are also electrified while the fuel cell system is on standby. The first accessories 37 are those which are required to be driven also during the standby time and include gas sensors 72, 73 for detecting leaks of gases such as natural gas (methane), reformed gas (hydrogen) and the like, the temperature sensors 21c, 23c, 24b, 25a, 26a, 62b, 63b, 63c, 65b, 71, the pressure sensors 45b, 45c and the like. The first accessories 37 are those which are necessary for observing the fuel cell system also during the standby time. The first accessories 37 are those driven at 5 volts together with a microcomputer of the fuel cell system controller 40 (i.e., electric components under 5 volts).

The second accessories 39 are second power loads which are electrified only during the operation (including a starting operation, a power generation operation and a shutdown operation) of the fuel cell system, but are not electrified during the standby time. The second accessories 39 are those driven during the operation, such as, for example, flow meters (not shown), the motor-driven pumps (such as the aforementioned unreformed fuel pump 41b and the like) and the electromagnetic valves (such as the aforementioned fuel valve 41a and the like). The second accessories 39 are those driven at 24 volts (i.e., electric components under 24 volts).

The inverter unit 31 is composed of a DC/DC converter 31a, a DC/AC inverter 31b, a system link inverter controller (hereafter referred to as inverter controller) 31d, and an inverter power supply DC/DC converter 31c.

The DC/DC converter 31a converts the direct current voltage (e.g., 40 volts) outputted from the fuel cell 10 into a predetermined direct current voltage (e.g., 350 volts). The DC/DC converter 31a converts the direct current voltage inputted from the fuel cell 10 into the predetermined direct current voltage and outputs the same through a DC/DC converter 36 for standby time operation to the system controller 40 and the first accessories 37 which are for operating the present fuel cell system. Further, the DC/DC converter 31a converts the direct current voltage inputted from the fuel cell 10 into the predetermined direct current voltage and outputs the same through a DC/DC converter 38 for standby time stop accessories to the second accessories 39 which are for operating the present fuel cell system.

The DC/DC converter 36 for standby time operation inputs the direct current voltage from the DC/DC converter 31a, the DC/AC inverter 31b and the rectifier circuit 32 and converts the voltage into a predetermined direct current (e.g., 5 volts) to supply the same as power voltage to the system controller 40 and the first accessories 37. The DC/DC converter 36 for standby time operation is being driven by being supplied with a driving electric power at all times.

The DC/DC converter 38 for standby time stop accessories inputs the direct current voltage from the DC/DC converter 31a, the DC/AC inverter 31b and the rectifier circuit 32 and converts the voltage into a predetermined direct current (e.g., 24 volts) to supply the same as power voltage to the second accessories 39. The driving of the DC/DC converter 38 for standby time stop accessories is controlled in accordance with a command from the system controller 40, wherein it is driven during the operation of the fuel cell system but is stopped from operation during the standby time.

The DC/AC inverter 31b inputs the direct current voltage (e.g., 350 volts) outputted from the DC/DC converter 31a and converts the voltage into alternating current voltage (e.g., 200 volts) to output the same to the power lines 34. The DC/AC inverter 31b converts the alternating current voltage (e.g., 200 volts) from the system power source inputted from the power lines 34 into the predetermined direct current voltage (e.g., 350 volts) and outputs the same to the DC/DC converter 36 for standby time operation and the DC/DC converter 38 for standby time stop accessories. In this way, the DC/AC inverter 31b has a function of converting direct current into alternating current and another function of converting alternating current into direct current.

The inverter power supply DC/DC converter 31c inputs the direct current voltage from the DC/DC converter 31a, the DC/AC inverter 31b and the rectifier circuit 32 and converts the voltage into the predetermined direct current voltage to output the same as power supply voltage (driving voltage) to the DC/DC converter 31a, the DC/AC inverter 31b and the inverter controller 31d. Like the DC/DC converter 36 for standby time operation, the inverter power supply DC/DC converter 31c is being driven by being supplied with a driving electric power at all times.

The rectifier circuit 32 is provided between the power lines 34 and the DC/DC converter 36 for standby time operation and the DC/DC converter 38 for standby time stop accessories in parallel with the DC/AC inverter 31b. The rectifier circuit 32 is able to rectify and convert the alternating current voltage from the power lines 34 into direct current voltage and is able to apply the same to the inverter controller 31d, the system controller 40 and the first and second accessories 37, 39 through the inverter power supply DC/DC converter 31c, the DC/DC converter 36 for standby time operation and the DC/DC converter 38 for standby time stop accessories. The input of the rectifier circuit 32 is connected between a system switch 30b and the power lines 34. For example, the rectifier circuit 32 is configured by four diodes being rectifier elements, which are arranged to constitute a diode bridge circuit. The rectifier circuit 32 may be combined with a transformer or may be combined with resistances, condensers, coils or the like for smoothing. The rectifier circuit 32 is able to supply the electric power from the system power source 33 to the inverter controller 31d, the system controller 40 and the first and second accessories 37, 39 regardless of the opening/closing of the system switch 30b.

Further, the inverter system 30 is provided with switches 30a, 30b, a current sensor 34a and a voltage sensor 34b. The switch 30a is one (fuel cell switch) which is arranged between the fuel cell 10 and the DC/DC converter 31a for bringing the fuel cell 10 and the DC/DC converter 31a into communication or blocking. The switch 30b is one (system switch) which is arranged between the DC/AC inverter 31b and the system power source 33 (external power loads 35) for bringing the DC/AC inverter 31b and the system power source 33 (external power loads 35) into communication or blocking. Each switch 30a, 30b is controlled to be opened or closed in accordance with a command from the inverter controller 31d (i.e., the command from the system controller 40, including that given by way of the inverter controller 31d).

The current sensor 34a is provided on the power lines 34 and detects electric current of the reverse flow electric power from the inverter system 30 toward the system power source 33, electric current of the forward flow electric power from the system power source 33 toward the inverter system 30 and the abnormality of the system power source 33 to output the detection signal to the inverter system 30, namely to the inverter controller 31d.

The voltage sensor 34b is provided between the switch 30b, the rectifier circuit 32 and the power lines 34, the power loads 35 and detects the voltage of the electric power from the inverter system 30 toward the power lines 34 (i.e., the system power source 33 or the power loads 35) or from the power lines 34 (i.e., the system power source 33 or the power loads 35) toward the inverter system 30. The detection result of the voltage sensor 34b is transmitted to the inverter controller 31d.

The current sensor 34a and the voltage sensor 34b respectively detect the R-phase and the S-phase of the system power source 33 being three single-phase lines. Each of the current sensor 34a and the voltage sensor 34b have two sensors for the R-phase and the S-phase. The electric power from the inverter system 30 to the power lines 34 or from the power lines 34 to the inverter system 30 can be obtained by adding the product of the current and voltage in the R-phase and the product of the current and voltage in the S-phase.

The inverter controller 31d controls the driving of the DC/DC converter 31a and the DC/AC inverter 31b and also controls the opening/closing of the respective switches 30a, 30b based on the detection signals from the current sensor 34a and the voltage sensor 34b as well as on the states of electric power from the DC/DC converter 31a and the DC/AC inverter 31b. The inverter controller 31d is connected to the system controller 40 to be communicatable mutually and controls the driving of the DC/DC converter 31a and the DC/AC inverter 31b in accordance with commands from the system controller 40.

Further, the inverter controller 31d is able to judge the kinds of power failures based on those relating to power failure of the detection signals from the current sensor 34a and the voltage sensor 34b. The inverter controller 31d detects being in a power failure based on the detection signals from the current sensor 34a and the voltage sensor 34b. In the case of a power failure, it detects that the voltage from the system power source 33 detected by the voltage sensor 34b is equal to or lower than a predetermined voltage (e.g., equal to or lower than 1/10 of the rating). The kinds of the power failures can be distinguished by, e.g., the length of the period of remaining in a power failure.

Further, based on those relating to the electric power of the system power source 33 of the detection signals from the current sensor 34a and the voltage sensor 34b, the inverter controller 31d is able not only to judge power failures and the kinds of the power failures but also to detect the abnormality of the system power source 33. In the case of a voltage abnormality, the same is detected by being out of a standard range (having been determined by a standard) which has been determined in dependence on a rated voltage. In the case of a frequency abnormality, the same is detected by being out of a standard range (having been determined by a standard) which determines the frequency of the voltage or current. Thus, besides the power failure of the system power source 33, it can be detected that the voltage or the frequency goes out of the predetermined standard range. That is, it is possible to detect that the system power source 33 has deteriorated in quality. The abnormalities of the system power source 33 include power failure, voltage abnormality, frequency abnormality and the like.

Where the accessories (37, 39) use the electric power converted by the inverter system 30 as is the case of the present embodiment, a problem arises on the inverter system 30 when the frequency or voltage of the system power source 33 goes beyond the predetermined standard range, and thus, the present invention is effective also in avoiding such a problem. In the case of the system wherein the accessories (37, 39) are directly driven by the system power source 33, a problem arises on the accessories (37, 39) when the frequency or voltage of the system power source 33 goes beyond the predetermined standard range, and thus, the present invention is effective also in avoiding such a problem.

Further, in the state that the fuel cell 10 is able to generate electric power, the inverter controller 31d calculates a power consumption consumed by the external power loads 35 based on the output power from the inverter unit 31 detected by the DC/AC inverter 31b as well as on the electric power which is inputted to, or outputted from, the system power source 33 and which is detected by the current sensor 34a and the voltage sensor 34b. For example, the sum of the output power from the inverter unit 31 and the electric power which is inputted to, or outputted from, the system power source 33 is calculated as the power consumption. The inverter controller 31d transmits the power consumption and the generated power of the fuel cell 10 to the system controller 40. The system controller 40 controls the supply quantities of the raw fuel, water and the like to be supplied to the reforming apparatus 20 so that the generated electric power of the fuel cell 10 coincides with an inputted power consumption. Where the power consumption exceeds the maximum generated electric power of the fuel cell 10, the fuel cell 10 is operated at the level of the maximum generated electric power. When detecting the power failure or the recovery of the system power source 33, the inverter controller 31d transmits such effect to the system controller 40.

The system controller 40 performs the entire control of the fuel cell system in cooperation with the inverter controller 31d. The system controller 40 controls the fuel cell 10 and the reforming apparatus 20 by controlling the driving of the aforementioned respective pumps and valves (the first and second accessories 37, 39), controls the driving of the inverter unit 31 and controls the DC/DC convertor 38 for the accessories. The system controller 40 remains supplied with the voltage at all times even during the standby time and even during the operation.

The operation of the inverter system as constructed above will be described. When the fuel cell system is on standby, the inverter controller 31d stops the driving of the DC/AC inverter 31b and the DC/DC converter 31a in response to a command from the system controller 40. That is, the inverter unit 31 stops its function of converting the alternating voltage from the power lines 34 (system power source 33) into the predetermined direct current voltage and outputting the same to the DC/DC converter 36 for standby time operation and the DC/DC converter 38 for standby time stop accessories. Further, during the standby time, the switches 30a, 30b are maintained in the open state.

On the other hand, the rectifier circuit 32 rectifies the alternating voltage from the power lines 34 for conversion into direct current voltage and supplies the same to the DC/DC converter 36 for standby time operation and the DC/DC converter 38 for standby time stop accessories. In response to a command from the system controller 40, the driving of the DC/DC converter 38 for standby time stop accessories is stopped. Thus, the electric power from the power lines 34 (system power source 33) is supplied to the DC/DC converter 38 for standby time stop accessories through the rectifier circuit 32 without passing through the inverter unit 31, but is not supplied to the second accessories 39.

Further, where electric power is being correctly supplied from the system power source 33, the DC/DC converter 36 for standby time operation is being driven at all times, so that the electric power from the power lines 34 (system power source 33) is supplied to the system controller 40 and the first accessories 37 through the rectifier circuit 32 and through the DC/DC converter 36 for standby time operation without passing through the inverter unit 31.

When the fuel cell system is at the time of preparation for power generation (at the time of a starting operation), the inverter controller 31d responsive to commands from the system controller 40 drives the DC/AC inverter 31b, stops the driving of the DC/DC converter 31a and brings the switches 30a, 30b respectively into the open and closed states. Thus, the electric power from the power lines 34 (system power source 33) is supplied through the switch 30b to the DC/AC inverter 31b and is converted into direct current electric power, which is supplied to the inverter power supply DC/DC converter 31c, the DC/DC converter 36 for standby time operation and the DC/DC converter 38 for standby time stop accessories and hence, to the system controller 40 and the first and second accessories 37, 39.

At this time, the voltage rectified by the rectifier circuit 32 is about 280 volts DC. Since the voltage rectified by the DC/AC inverter 31b is about 350 volts DC and is higher than 280 volts DC, the rectification function improved in power factor of the DC/AC inverter 31b is brought into operation, while the rectifier circuit 32 remains stopped not to consume electric power. Where abnormality occurs in the inverter unit 31, the rectifier circuit 32 is operated to supply electric power.

Further, when the fuel cell system is in the power generation operation, the inverter controller 31d responsive to commands from the system controller 40 drives the DC/DC converter 31*a* and the DC/AC inverter 31*b* and brings the switches 30*a*, 30*b* into the closed state. Thus, the electric power from the fuel cell 10 is supplied through the DC/DC converter 31*a* and the DC/DC converter 36 for standby time operation to the system controller 40 and the first accessories 37 and is supplied through the DC/DC converter 31*a* and the DC/DC converter 38 for standby time stop accessories to the second accessories 39. Further, the electric power from the fuel cell 10 is supplied through the DC/AC inverter 31*b* to the external power loads 35. Also at this time, like the time of the starting operation, the rectified circuit 32 remains in the stopped state.

Further, when the fuel cell system is in the stopping operation (stop processing), if the electric power generated with the remaining fuel in the fuel cell 10 is more than an accessory-consumed power (power consumption by the system controller 40, the first and second accessories 37, 39 and the like) used for the stop processing, the inverter controller 31*d* responsive to commands from the system controller 40 drives the DC/DC converter 31*a* and the DC/AC inverter 31*b* and brings the switches 30*a*, 30*b* into the closed state. Thus, the electric power from the fuel cell 10 is used as the accessory-consumed power, and the reminder of the electric power is supplied to the external power loads 35 through the DC/AC inverter 31*b*.

If the generated electric power with the remaining fuel in the fuel cell 10 is less than the accessory-consumed power used for the stop processing, the inverter controller 31*d* responsive to a command from the system controller 40 drives the DC/DC converter 31*a* and the DC/AC inverter 31*b* and brings the switches 30*a*, 30*b* into the closed state. Thus, the electric power from the fuel cell 10 is used as the accessory-consumed power, and the shortfall in the power is supplied from the system power source 33 through the DC/AC inverter 31*b*.

When the output power of the fuel cell 10 becomes less than a predetermined electric power, the inverter controller 31*d* responsive to a command from the system controller 40 stops the driving of the DC/DC converter 31*a*, drives the DC/AC inverter 31*b* and brings the switches 30*a*, 30*b* respectively into the open state and the closed state. Thus, the accessory-consumed electric power is supplied from the system power source 33 through the DC/AC inverter 31*b*.

The standby time means the state that the fuel cell system stops generating electric power (i.e., the state that neither of the staring operation, the power generation operation and the stopping operation is being performed) and means the state that a waiting lasts for a power generation command (such as ON of a start switch).

4) Waste Heat Collection System

Next, a waste heat collection system will be described. As shown in FIG. 1, the waste heat collection system is provided with a reserved hot water tank 61 for storing reserved hot water, a reserved hot water circulation circuit 62 provided, independently of a condensing refrigerant circulation circuit 65, for circulating the reserved hot water, an FC cooling water circulation circuit 63 which is a fuel cell heat medium circulation circuit for circulating FC cooling water being a fuel cell heat medium exchangeable in heat with the fuel cell 10, a first heat exchanger 64 for performing heat exchange between the reserved hot water and the fuel cell heat medium, the condensing refrigerant circulation circuit 65 for circulating condensing refrigerant being liquid including the water which has collected at least the waste heat discharged from the full cell 10 and/or the waste heat generated in the reforming apparatus 20, a second heat exchanger 66 for performing heat exchange between the reserved hot water and the condensing refrigerant, and a condenser 67.

Thus, the waste heat (thermal energy) generated by the power generation of the fuel cell 10 is collected by the FC cooling water and is then collected by the reserved hot water through the first heat exchanger 64, whereby the reserved hot water is heated (raised in temperature). Further, the waste heat (thermal energy) of the offgases (anode offgas and cathode offgas) exhausted from the fuel cell 10 and the waste heat (thermal energy) generated in the reforming apparatus 20 are collected by the condensing refrigerant through the condenser 67 and is then collected by the reserved hot water through the second heat exchanger 66, whereby the reserved hot water is heated (raised in temperature). The waste heat generated in the reforming apparatus 20 includes the waste heat of reformed gas, the waste heat of combustion exhaust gas form the burner section 25 and the waste heat (waste heat of the reforming apparatus per se) for which heat exchange is performed with the reforming apparatus 20. "FC" in the present description and the accompanying drawings is noted as the abbreviation for "fuel cell".

The reserved hot water tank 61 is provided with one pillar-like container, in which hot water is stored in a layered structure, that is, in such a form that the temperature is the highest on the top portion, becomes lower as the layer goes down and is the lowest at the bottom portion. Water (low temperature water) such as tap water is replenished to the bottom of the pillar-like container of the reserved hot water tank 61, while the high temperature hot water stored in the reserved hot water tank 61 is led out from the top of the pillar-like container of the reserved hot water tank 61. The reserved hot water tank 61 is of a sealed type, so that it is of the type that the tap water pressure acts inside and hence, on the reserved hot water circulation circuit 62 as it is.

One end and the other end of the reserved hot water circulation circuit 62 are connected to the bottom and top of the reserved hot water tank 61. From the one end toward the other end thereof, the reserved hot water circulation circuit 62 has arranged thereon in order a reserved hot water circulating pump 62*a* being a reserved hot water circulating device, the temperature sensor 62*b*, the second heat exchanger 66, and the first heat exchanger 64.

The reserved hot water circulating pump 62*a* is for drawing the reserved hot water at the bottom of the reserved hot water tank 61 to discharge the reserved hot water toward the top of the reserved hot water tank 61 by way of the reserved hot water circulation circuit 62 and is controllable by the system controller 40 to have its flow quantity (outflow volume) put under control. Thus, the reserved hot water from the reserved hot water tank 61 flows through the second heat exchanger 66 and the first heat exchanger 64 in order and is subjected to heat exchange with the condensing refrigerant at the second heat exchanger 66 and further to heat exchange with the FC cooling water at the first heat exchanger 64. The temperature sensor 62*b* is provided at a downstream portion of the part which becomes the lowest in temperature on the reserved hot water circulation circuit 62, to detect a reserved hot water tank outlet temperature T6 of the reserved hot water flowing through the part. The downstream portion is between the part which becomes the lowest in temperature and an inlet of the second heat exchanger 66. The temperature of reserved hot water measured by the temperature sensor 62*b* is transmitted to the system controller 40.

On the FC cooling water circulation circuit 63, the temperature sensor 63*c*, the first heat exchanger 64, an FC cooling water circulating pump 63*a* being an FC cooling water circulating device, and the temperature sensor 63*b* are arranged in order along the flow (the direction indicated by the arrow in FIG. 1) of the FC cooling water starting at the fuel cell 10. The FC cooling water circulating pump 63a is for circulating the FC cooling water in the direction indicated by the arrow in FIG. 1 and is controllable by the system controller 40 to have its flow quantity (outflow volume) put under control. Thus, the FC cooling water flows through the fuel cell 10 to rise in temperature by collecting the heat generated in the fuel cell 10 and, after lowered in temperature as a result of the heat being collected by the reserved hot water at the first heat exchanger 64, flows again through the fuel cell 10. Further, where the temperature of the FC cooling water is low at the time of a starting operation, it is possible on the contrary to raise the FC cooling water and hence, the fuel cell 10 in temperature with the heat of the reserved hot water.

The temperature sensors 63b, 63c are for respectively detecting an inlet temperature T7 and an outlet temperature T8 of the FC cooling water at the inlet and outlet of the fuel cell 10 to output the detection results to the system controller 40.

A condensing refrigerant circulating pump 65a being a waste heat collecting heat medium circulating device is arranged on the condensing refrigerant circulation circuit 65 being a waste heat collecting heat medium circulation circuit. The condensing refrigerant circulating pump 65a is for circulating condensing refrigerant being a waste heat collecting heat medium in the direction of the arrow and is controllable by the system controller 40 to have its flow quantity (outflow volume) put under control. Further, the second heat exchanger 66 is arranged on the condensing refrigerant circulation circuit 65. In addition, on the condensing refrigerant circulation circuit 65, the condensing refrigerant circulating pump 65a, an anode offgas condenser 67a, a combustion gas condenser 67b, a cathode offgas condenser 67c, a reformed gas condenser 67d, and the temperature sensor 65b in order at the downstream side of the second heat exchanger 66. The temperature sensor 65b detects a heat exchanger inlet temperature T9 of the condensing refrigerant to output the detection result to the system controller 40.

The anode offgas condenser 67a, the combustion gas condenser 67b, the cathode offgas condenser 67c and the reformed gas condenser 67d are provided on mid portions of the offgas supply pipe 47, the combustion gas exhaust pipe 55, the cathode offgas exhaust pipe 51 and the reformed gas supply pipe 45, respectively. Although depicted separately in the figure, these respective condensers 67a-67d constitute the condenser 67 of a one-body structure in which they are connected integrally. The condenser 67 is not limited to the one-body structure and may be constituted by two or more structures.

The reformed gas condenser 67d condenses the steam in the reformed gas which flows through the reformed gas supply pipe 45 to be supplied to the fuel electrode 11 of the fuel cell 10. The anode offgas condenser 67a condenses the steam in the anode offgas which flows through the offgas supply pipe 47, making communication between the fuel electrode 11 of the fuel cell 10 and the burner section 25 of the reforming apparatus 20, to be exhausted from the fuel electrode 11 of the fuel cell 10. The cathode offgas condenser 67c condenses the steam in the cathode offgas which flows through the cathode offgas exhaust pipe 51 to be exhausted from the air electrode 12 of the fuel cell 10. The combustion gas condenser 67b condenses the steam in the combustion exhaust gas which flows through the combustion exhaust pipe 55 to be exhausted from the reforming apparatus 20. In these condensers 67a-67d, the condensing refrigerant performs heat exchange with the respective gases flowing through the respective condensers 67a-67d and rises in temperature as a result of collecting the sensible heats and the latent heats of the respective gases.

These condensers 67a-67d are in communication with the reforming water tank 43a through a pipe 56. The reforming water tank 43a is for temporarily storing the collected water as reforming water.

Further, the fuel cell system is provided with a case 1. The case 1 contains therein the fuel cell 10, the reforming apparatus 20, the inverter system 30, the system controller 40, the first and second accessories 37, 39 and the waste heat collection system 60 (expect for the reserved hot water tank 61 and a part of the reserved hot water circulation circuit 62), all aforementioned. On an upper portion of the case 1, there is provided a temperature sensor 71 for detecting the temperature T10 of the upper portion, and the temperature sensor 71 outputs the detection result to the system controller 40.

On the top of the case 1, there is provided an exhaust port 1a for exhausting the gas in the case 1. The two gas sensors 72, 73 are provided on the inside of the exhaust port 1a. The gas sensors 72, 73 are for respectively detecting the density of hydrogen and the density of methane (the density of the unreformed fuel) and output the detection results to the system controller 40.

The case 1 is provided with a ventilation fan 1b. The ventilation fan 1b cools the interior of the case 1 by ventilating the case 1 to flow the outside air thereinto and is driven in response to a command from the system controller 40. The ventilation fan 1b may cool the interior of the case 1 by flowing the air in the case 1 outside.

Further, the system controller 40 is connected to the temperature sensors 21c, 23c, 24b, 25a, 26a, 62b, 63b, 63c, 65b, 71, the respective pressure sensors 45b, 45c, the respective gas sensors 72, 73, the respective pumps 41b, 43b, 46a, 49a, 52a, 53a, 62a, 63a, 65a, the respective valves 41a, 41d, 54a, 43c, 46b, 52b, 49b, 51a, 45a, 48a, 47a, the burner section 25 (ignition electrode), the ventilation fan 1b and the inverter controller 31d, all aforementioned (refer to FIG. 4). The system controller 40 has a microcomputer (not shown), which is provided with an input/output interface, a CPU, a RAM and a ROM (all not shown) which are all connected through buses. The CPU is responsive to the temperatures from the temperature sensors 21c, 23c, 24b, 25a, 26a, 62b, 63b, 63c, 65b, 71, the pressures from the respective pressure sensors 45b, 45c, the gas densities from the respective gas sensors 72, 73 and information inputted from the inverter controller 31d and performs the operation of the fuel cell system by executing the driving of the respective pumps 41b, 43b, 46a, 49a, 52a, 53a, 62a, 63a, 65a, the openings/closings of the respective valves 41a, 41d, 54a, 43c, 46b, 52b, 49b, 51a, 45a, 48a, 47a, the control of the burner section 25, the driving of the ventilation fan 1b and the control of the inverter system 30. The RAM is for temporarily storing variables necessary for executions of programs for such operation, and the ROM is for storing the programs.

5) One Example of Basic Operation of Fuel Cell System

Next, description will be made regarding one example of the basic operation of the aforementioned fuel cell system. The system controller 40 begins a starting operation in either of the cases that the operation is started upon depression of a start switch (not shown) and that the operation is started in accordance with an operation schedule. With the beginning of the starting operation, the switch 30b is brought into the closed state in respond to a command from the inverter controller 31d, and the electric power from the system power source 33 is supplied to the inverter system 30. The inverter controller 31d, the system controller 40 and the first and second accessories 37, 39 are driven by the supplied electric power from the system power source 33.

The system controller 40 supplies combustion air to the burner section 25 and electrifies the ignition electrode of the burner section 25, as mentioned earlier. Further, the system controller 40 supplies combustion fuel to the burner section 25, as mentioned earlier. Thus, the combustion fuel is brought into premixed combustion at the burner section 25, and the resultant combustion gas heats the reforming section 21 and the evaporator section 26. At this time, the unreformed fuel valve 41d, the reforming water valve 43c, the oxidizing air valve 46b, the first reformed gas valve 45a, the second reformed gas valve 48a, the offgas valve 47a and the fuel valve 54a remain closed.

Then, the system controller 40 controls the reforming water valve 43c and the reforming water pump 43b to supply a predetermined quantity of water to the evaporator section 26 and then, stops the supplying of water temporarily. Thereafter, when the temperature sensors 26a indicates a predetermined value (e.g., 100° C.) or higher, the system controller 40 judges that steam has been generated. Then, after confirming the generation of steam, the system controller 40 opens the reforming water valve 43c and drives the reforming water pump 43b to begin supplying water to the evaporator section 26 at a predetermined flow rate.

Thereafter, the system controller 40 opens the unreformed fuel valve 41d and drives the unreformed fuel pump 41b to supply unreformed fuel to the reforming section 21. Further, the system controller 40 opens the oxidizing air valve 46b and drives the oxidizing air pump 46a to supply oxidizing air by a predetermined flow rate (predetermined supply quantity) to the CO selective oxidizing section 24. Thus, the mixture gas of unreformed fuel and stem is supplied to the reforming section 21, and in the reforming section 21, the aforementioned steam reforming reaction and carbon monoxide shift reaction take place to generate reformed gas. Then, the reformed gas led out from the reforming section 21 warms up the CO shift section 23 (and the CO selective oxidizing section 24), is led out from the CO selective oxidizing section 24 and is directly supplied to the burner section 25 through the bypass pipe 48 without passing through the fuel cell 10, to be burned.

While the reformed gas is being generated in this way, the reformed gas being at a high temperature is supplied from the reforming section 21 to the CO shift section 23. The temperature of the supplied reformed gas causes the CO shift section 23 to rise in temperature in order from the upstream side. When the upstream portion increased in temperature reaches the active temperature of the CO shift section 23, there is added a temperature increase owing to the generation of heat which results from the catalyzer reaction. As a result, the CO shift section 23 rises in temperature in order from the upstream side thereof at the time of the starting operation, and the area being at a predetermined temperature or higher spreads from the upstream side toward the lower stream side. A heater for warming up the reformed gas may be provided on the inlet side of the CO shift section 23 to accelerate the warm-up, by which a similar control is possible.

Further, when, in such generation of the reformed gas, the temperature (T3) of the CO shift section 23 and/or the temperature (T4) of the CO selective oxidizing section 24 reaches a predetermined temperature, that is, when judging that the density of the carbon monoxide in the reformed gas led out from the CO selective oxidizing section 24 has gone down to a predetermined density or lower, the system controller 40 opens the first reformed gas valve 45a and the offgas valve 47a and closes the second reformed gas valve 48a to bring the CO selective oxidizing section 24 into connection with the inlet of the fuel electrode 11 of the fuel cell 10 and to bring the outlet of the fuel electrode 11 into connection with the burner section 25. Thus, the fuel cell 10 starts a power generation operation. With starting of the power generation, the switch 30a is brought into the closed state in response to a command from the inverter controller 31d, whereby the output electric power from the fuel cell 10 is supplied to the inverter system 30.

During the power generation operation, the system controller 40 controls the aforementioned respective pumps 41b, 52a, 46a, 49a, 43b to supply unreformed fuel, combustion air, oxidizing air, cathode air and reforming water so that the generated electric power coincides with the power consumption by the external power loads 35 which it receives from the inverter controller 31d. The supply quantity of unreformed fuel is set to a supply quantity which depends on a desired output electric current. The supply quantity of combustion air and the supply quantity of reforming water are determined in dependence on the supply quantity of unreformed fuel.

When, in such power generation operation, the operation is to be stopped by the depression of a stop switch (not shown) or the operation is to be stopped in accordance with the operation schedule, the system control 40 executes a stopping operation (stopping processing).

The system controller 40 stops the driving of the unreformed fuel pump 41b to stop supplying unreformed fuel and closes the fuel valve 41a and the unreformed fuel valve 41d. The system controller 40 stops the driving of the reforming water pump 43b to stop supplying reforming water and closes the reforming water valve 43c. The system controller 40 stops the driving of the oxidizing air pump 46a to stop supplying oxidizing air and closes the oxidizing air valve 46b. The system controller 40 stops the driving of the combustion air pump 52a to stop supplying combustion air and closes the combustion air valve 52b. Then, the system controller 40 closes the first reformed gas valve 45a, the offgas valve 47a, and the second reformed gas valve 48a. Further, the system controller 40 closes the fuel valve 54a and closes the cathode air valve 49b and the cathode offgas valve 51a. Thus, the reforming apparatus 20 and the fuel cell 10 are sealed.

At this time, if the fuel cell 10 is generating electric power with the remaining fuel, the output electric power is supplied to the first and second accessories 37, 39 and the like. Then, upon termination of the power generation with the remaining fuel, the inverter controller 31d brings the switch 30a into the open state and maintains the switch 30b in the closed state to supply the electric power from the system power source 33 to the first and second accessories 37, 39 and the like. Further, upon termination of the stopping operation, the inverter controller 31d brings the switch 30b into the open state.

When such a stopping operation is terminated, the fuel cell system is brought into the standby state (standby time). The standby time means that the fuel cell system is in the state of stopping power generation (i.e., it is in neither of the starting operation, the power generation operation and the stopping operation) and means the state in which it is waiting for a power generation command (ON of the start switch or the like). That is, the state that the stopping operation was terminated is maintained. Even during the standby time, the power supply voltage is being supplied to the inverter controller 31d, the system controller 40 and the first accessories 37, as mentioned earlier.

6) One Operation Example of Fuel Cell System in the Case that System Power Source Falls in Power Failure Next, the operation where the system power source falls in a power failure in the aforementioned fuel cell system will be described with reference to flow charts shown in FIGS. 5 through 8.

6-1) From Power Failure Occurrence to Power Recovery

The inverter controller 31*d* is always observing, based on the detection signals from the current sensor 34*a* and the voltage sensor 34*b*, whether or not a power failure has occurred on the system power source 33 (step 102). When detecting that the power failure of the system power source 33 has occurred, the inverter controller 31*d* makes a judgment of "YES" at step 102 and receives from the system controller 40 information indicating that the system operation state at the time of the power failure occurrence is either one of the starting operation, the power generation operation, the stopping operation and the standby state, to store the information (step 104).

If the power generation operation is being performed at the time of the power failure occurrence and if the fuel cell 10 is in the state of being able to continue the power generation, the inverter controller 31*d* makes judgments of "YES" at steps 106 and 108 and brings the switch 30*b* into the open state to block the inverter system 30 from the system power source 33 and also brings the switch 30*a* into the closed state to connect the inverter system 30 with the fuel cell 10 (step 110). In addition, the system controller 40 receives from the inverter controller 31*d* information indicating that the power failure has occurred, and continues the power generation by the fuel cell 10 as long as possible from the time of the power failure occurrence. "As long as possible" mentioned here means as long as the fuel cell 10 lasts at an appropriate temperature for power generation. During this time, there is performed a stand-alone operation in which the generated electric power is consumed within the fuel cell system. The power generation subsequent to the time of the power failure occurrence may be continued not for the period of being as long as possible but for a predetermined time period.

Where the limit of possible power generation is reached (the predetermined time period has lapsed) or where the starting operation or the stopping operation is being performed at the time of the power failure occurrence, the inverter system 31 makes a judgment of "NO" at step 106 or 108, whereby a system shutdown is performed (step 112). The system shutdown means that the system controller 40 stops the driving of the respective pumps which are for controlling fluids (unreformed fuel, reforming water, cathode air and the like) supplied to the aforementioned reforming apparatus 20 and the fuel cell 10, and controls the respective valves into the closed state and that the inverter controller 31*d* brings the switch 30*a* into the open state. With the system shutdown, the temperatures and pressures in the reforming apparatus 20 and the fuel cell 10 rise abruptly. It is possible to remove this state through a recovery operation referred to later.

Subsequently, when the system power source 33 is recovered from the power failure, the inverter controller 31*d* detects the recovery of the system power source 33 based on the detection signals from the current sensor 34*a* and the voltage sensor 34*b* (judges as "YES" at step 114). Until the power supply is recovered, the inverter controller 31*d* repeats making the judgment of "NO" at step 114. Upon detecting the recovery of the system power source 33, the inverter controller 31*d* (or the system controller 40) reports an error notifying the occurrence of a power failure and brings the fuel cell system into a post-power failure standby state. The post-power failure standby state is the same as the state in which the system was brought into shutdown.

6-2) State Checking Operation in Recovery Operation

When the fuel cell system is placed in the post-power failure standby state, the system controller 40 checks the state of the fuel cell system. Specifically, the system controller 40 executes a state checking operation in accordance with a flow chart shown in FIG. 6.

Upon recovery of electric power, driving power is supplied through the rectifier circuit 32 to the inverter power supply DC/DC converter 31*c*, the inverter controller 31*d*, the system controller 40 and the first accessories 37. The inverter power supply DC/DC converter 31*c*, the inverter controller 31*d*, the system controller 40 and the first accessories 37 are driven by being supplied with the electric power.

The gas sensors 72, 73 are included in the first accessories 37, and when started to be driven by the driving power supply after the recovery of electric power, the system controller 40 waits until the operations thereof become stable (step 204). The gas sensors 72, 73 are classified by a high-temperature operating type and a normal-temperature operating type. In a sensor of the high-temperature operating type, a heater is provided to maintain the sensor at the operating temperature. In the sensor of this type, it is checked that an appropriate temperature has reached or it is checked that the sensor output has become stable. In a sensor of the normal-temperature operating type, it is checked that the sensor output has become stable.

The respective temperatures sensors 21*c*, 26*a*, 23*c*, 24*b*, 25*a*, 62*b*, 63*b*, 63*c*, 65*b* and 71 are also included in the first accessories 37, and when they are started to be driven by the driving power supply after the recovery of electric power, the system controller 40 waits until the operations of the sensors become stable (step 204). It is checked that the sensor output of each temperature sensor has become stable. Where a device for detecting abnormalities of the sensors is provided, the checking is carried out by utilizing such a device whether they are gas sensors or temperature sensors.

The system controllers 40 begins to detect the signals form the gas sensors 72, 73 and the respective temperature sensors (21*c* and the like) and abnormalities thereof (step 206). Then, based on the detected signals, the system controller 40 judges (checks) the occurrences of abnormalities such as component faults, fire, gas leaks and the like. For example, the component faults include disconnections and short-circuits in the gas sensors 72, 73 and the respective temperature sensors (21*c* and the like). Further, a fire caught in the case 1 can be detected by the temperature sensor 71 for detecting the temperature (T10) in the case 1 and the temperature sensor 25*a* for detecting the outer wall surface temperature (T5) of the burner section 25. Of gas leaks occurring in the case 1, the leak of reformed gas (hydrogen) can be detected by the gas sensor 72, while the leak of natural gas can be detected by the gas sensor 73. The abnormalities in the abnormality detections noted herein mean the state that a damage is liable to occur in the fuel cell system if the operation of the fuel cell system is restarted.

When detecting the fault or abnormality of a component, the system controller 40 makes a judgment of "YES" at step 208 and brings the fuel cell system into an abnormality standby state to inhibit the restart thereof (step 210). Where the restart is inhibited, such is notified to the user, and the inhibition of the restart is cancelled after an appropriate processing (repair) is carried out. At step 208, a judgment is made of whether or not the fault or abnormality of a component has occurred. The fault and abnormality of a component may be separately detected to be set as operation inhibiting error, in which case there is needed nothing but judging the occurrence of the operation inhibiting error.

When not detecting the fault or abnormality of a component, the system controller 40 makes a judgment of "NO" at step 208 and judges (checks) the occurrences of temperature abnormalities (unusually high temperatures) of the fuel cell 10, the reforming apparatus 20, the waste heat collection system 60. If the temperature detected by either one of the respective temperature sensors 21*c*, 26*a*, 23*c*, 24*b*, 25*a*, 62*b*, 63*b*, 63*c*, 65*b* and 71 continues to remain within a higher temperature range than a predetermined normal range for a predetermined time period or longer, the system controller 40 judges being at an unusually high temperature, makes judgments of "YES" at steps 212 and 214 and brings the fuel cell system into the abnormal standby state to inhibit the restart (step 210). The shortest time period of the predetermined time period is set to such a level as to avoid a misjudgment which may be incurred due to being temporarily at a high temperature, whereas the maximum time period thereof is set to such a level as to avoid a misjudgment which may be incurred when the temperature rises in the post-power failure standby state shortly after the system shutdown.

Then, unless the fault or abnormality of a component is detected and unless either of the temperatures detected by the respective temperature sensors (21*c* and the like) is the unusually high temperature which lasts for the predetermined time period, the system controller 40 makes judgments of "NO" at steps 208, 212 and sets that the state of the fuel cell system has been checked (step 216).

6-3) Cooling Processing for Burner Section in Recovery Operation

After the state of the fuel cell system is checked, the system controller 40 starts a substantial recovery operation for the fuel cell system. In the case that the fuel cell system was not correctly stopped at the occurrence of the power failure in the system power source 33, the recovery operation is automatically carried out so that the fuel cell system is brought into a restartable state. The recovery operation includes a cooling processing for cooling the burner section 25 and a pressure regulation processing for regulating the pressures in respective interiors of the fuel cell 10 and the reforming apparatus 20. The recovery operation also includes a state checking operation and a cooling processing for the burner section. The cooling processing is first executed, upon completion of which the pressure regulation processing is carried out.

When checking the state of the fuel cell system (making a judgment of "YES" at step 302), the system controller 40 drives the DC/DC converter 38 for standby time stop accessories and begins supplying a driving electric power to the second accessories 39 (step 304). Thus, the driving electric power is supplied to the second accessories 39.

The second accessories 39 include the pressure sensors 45*b*, 45*c*, flow meters (not shown), the respective valves (41*a* and the like) and the respective pumps (41*b* and the like). The system controller 40 starts detecting the signals from the pressure sensors 45*b*, 45*c* and the flow meters (not shown) and detecting the abnormalities about the pressure sensors 45*b*, 45*c*, the flow meters (not shown), the respective valves (41*a* and the like) and the respective pumps (41*b* and the like). Then, the system controller 40 judges (checks) the occurrences of the fault and the unusually high temperature of a component based on the detected signals (step 306). For example, the faults of components include disconnections and short circuits of the pressure sensors 45*b*, 45*c*, the flow meters (not shown), the respective valves (41*a* and the like) and the respective pumps (41*b* and the like). When detecting the fault or abnormality of a component, the system controller 40 makes a judgment of "YES" at step 307 and brings the fuel cell system into the abnormal standby state to inhibit the restart thereof (step 314). At step 307, like the aforementioned step 208, the occurrence of a faulted component or abnormality detection is judged.

When not detecting the fault or abnormality of a component, the system controller 40 makes a judgment of "NO" at step 307 and executes the cooling processing for the burner section 25. Specifically, the system controller 40 judges whether or not the temperature of the burner section 25 in the reforming apparatus 20 is a normally ignitable temperature (200° C. or lower) (step 308). Here, the temperature of the burner section 25 is the temperature (T1) detected by the temperature sensor 21*c*. The temperature sensor 21*c* is provided in the reforming section 21, and in this case, the purpose thereof is to detect the temperature in the combustion chamber (burner section 25). Because providing the temperature sensor in the combustion chamber gives rise to a problem about the durability of the sensor per se, it is provided in the vicinity of a wall close to the combustion chamber of the reforming section 21. The temperature sensor may be provided in the combustion chamber.

If the burner section temperature (T1) is higher than 200° C., it is judged that not only the burner section 25 but also the interior of the fuel cell system is high in temperature (judged as "NO" at step 308), the cooling processing is carried out. The cooling processing covers not only the cooling of the burner section 25 but also the cooling of the whole fuel cell system.

Figure 8:
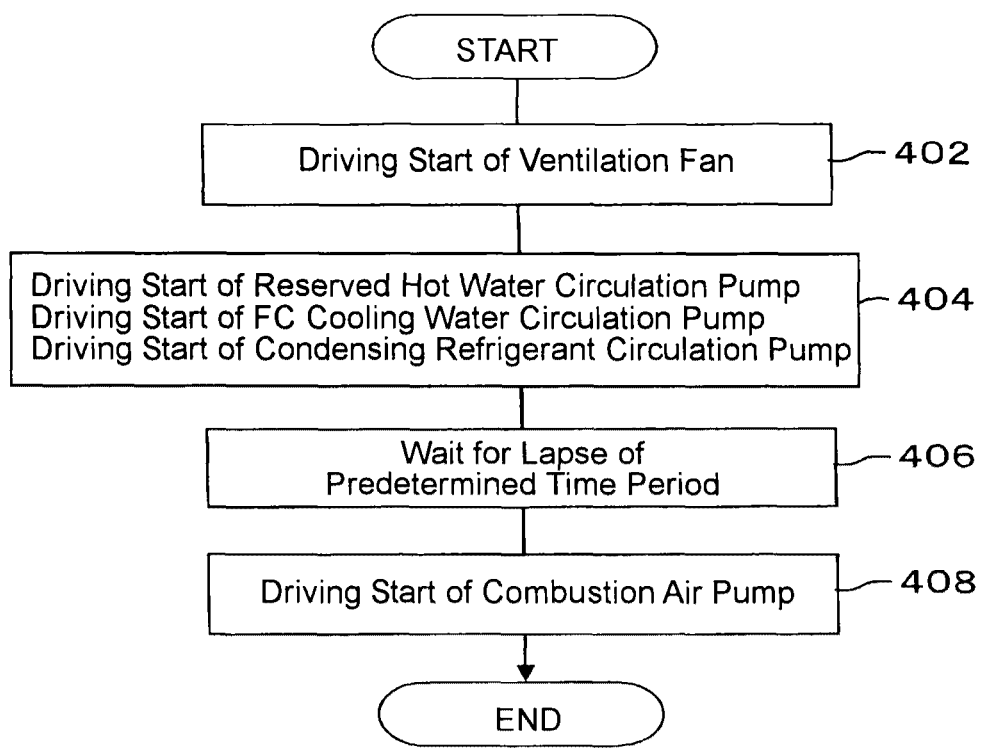
FIG. 8 is a flow chart of a control program executed by the controller shown in FIG. 1.

As the cooling processing, there is executed at least a cooling processing in accordance with the flow chart shown in FIG. 8. The system controller 40 starts the driving of the ventilation fan 1*b* at step 402 to lower the temperature inside of the case 1. Then, the system controller 40 starts the driving of the reserved hot water circulation pump 62*a*, the FC cooling water circulation pump 63*a* and the condensing refrigerant circulation pump 65*a* at step 404. At this time, at least the condensing refrigerant circulation pump 65*a* may be started to be driven. Further, the condensing refrigerant circulation pump 65*a* may be driven first, and then, the reserved hot water circulation pump 62*a* and the FC cooling water circulation pump 63*a* may be driven.

The system controller 40 waits for the lapse of a predetermined time period (e.g., 2 minutes) (step 406) and then, starts the driving of the combustion air pump 52*a* (step 408). At this time, since the burner section 25 has only been supplied with combustion air which can be obtained from the atmosphere around the fuel cell system, the burner section 25 being high in temperature is cooled with the combustion air being relatively low (e.g., 20° C.). On the other hand, the combustion air which has risen in temperature as a result of collecting the heat of the burner section 25 is exhausted toward the outside through the combustion gas exhaust pipe 55. In the combustion gas condenser 67*b* provided on the combustion gas exhaust pipe 55, heat exchange is carried out between the combustion air having become a high temperature and the condensing refrigerant in the condensing refrigerant circulation circuit 65. However, when the condensing refrigerant stops moving without being circulated (being flown), there may arise a risk that the condensing refrigerant in the combustion gas condenser 67*b* is heated to damage the combustion gas condenser 67*b*. Thus, to preclude this, it is performed to make the condensing refrigerant flown before the combustion air is circulated. Further, since the waste heat from the burner section 25 (the reforming apparatus 20) can be collected through the combustion air by the condensing refrigerant and hence, by the reserved hot water, it is possible to maintain the heat collection efficiency high.

The condensing refrigerant is a first heat medium for collecting the waste heat of the reforming apparatus 20, the condensing refrigerant circulation circuit 65 is a first heat medium circulation circuit, and the condensing refrigerant circulation pump 65a is a first heat medium circulation means for circulating the first heat medium. Further, the cooling by the ventilation fan 1b may be started after the cooling of the burner section 25 with the combustion air.

Further, at step 312, the system controller 40 judges the occurrence of an unusually high temperature at the same time as it performs the aforementioned cooling processing. That is, regardless of executing the cooling processing, the system controller 40 judges the occurrence of the unusually high temperature if each of the temperatures detected by the respective temperature sensors 21c, 26a, 23c, 24b, 25a, 62b, 63b, 63c, 65b, 71 reaches a temperature range which is higher than a predetermined normal range, to make a judgment of "YES" at step 312 and inhibits the restart of the fuel cell system to make the same wait due to the abnormal state (step 314).

Unless judging as the unusually high temperature, the system controller 40 goes on the cooling processing (step 310), and if the burner section temperature (T) becomes equal to 200° C. or lower, makes a judgment of "YES" at step 308, whereby the program is advanced to step 316 and those subsequent thereto to execute the pressure regulation processing.

Figure 9:
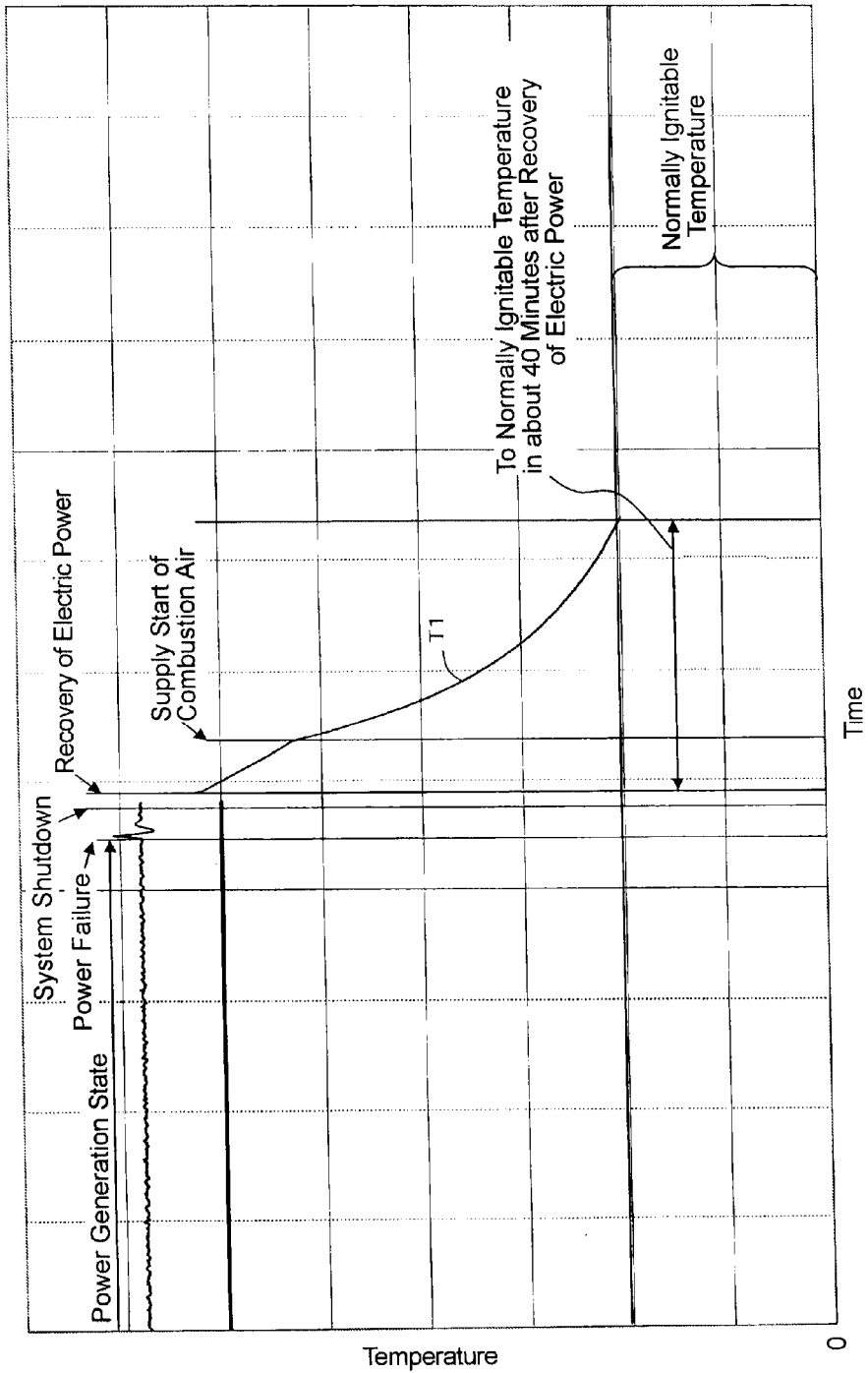
FIG. 9 is a time chart showing the transition of a wall-around temperature (T1) of a reforming apparatus under a cooling processing according to the present invention.
Figure 10:
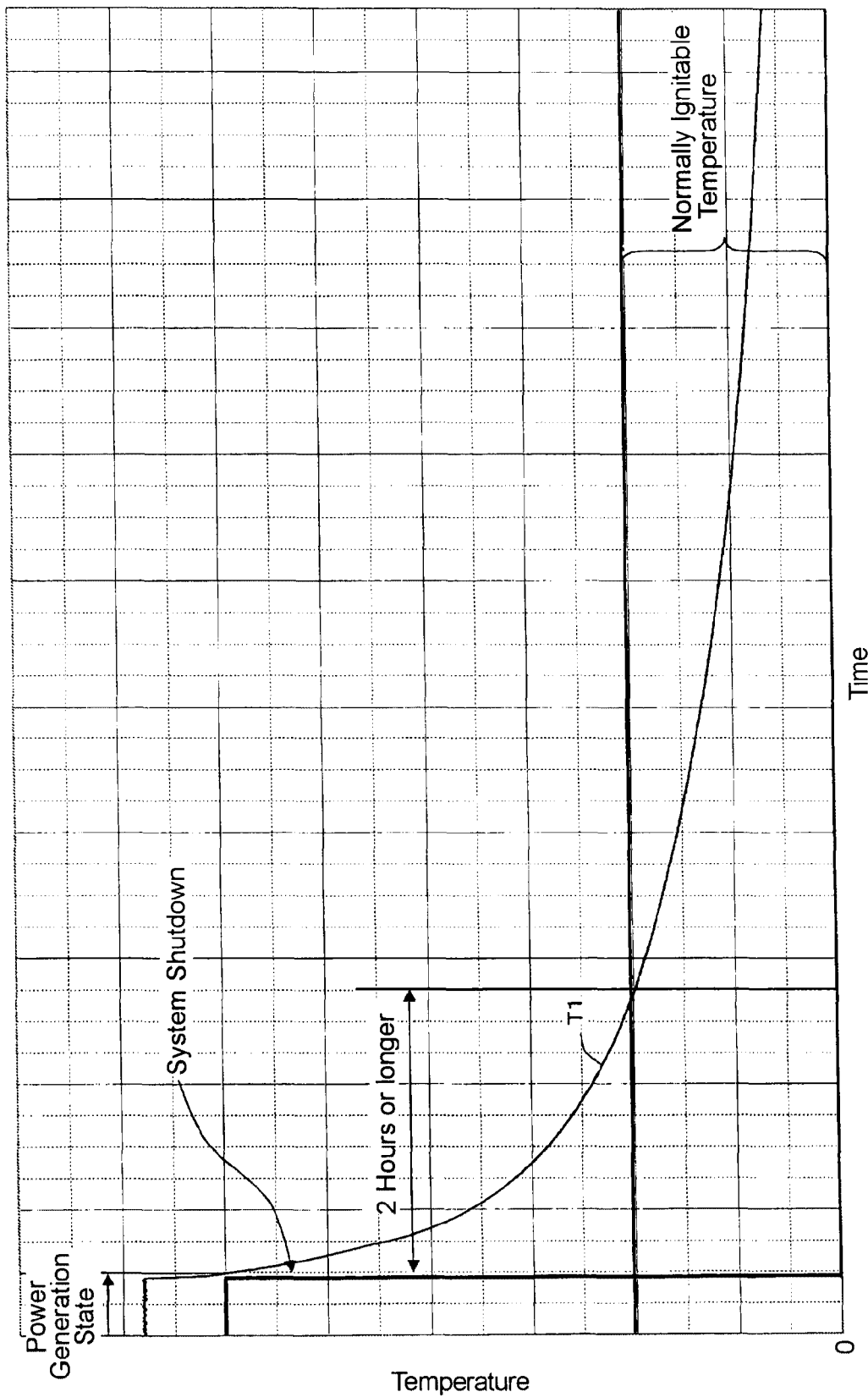
FIG. 10 is a time chart showing the transition of the wall-around temperature (T1) of the reforming apparatus in the case that upon occurrence of a power failure, a normal stopping processing is not performed without execution of the cooling processing according to the present invention.
Figure 11:
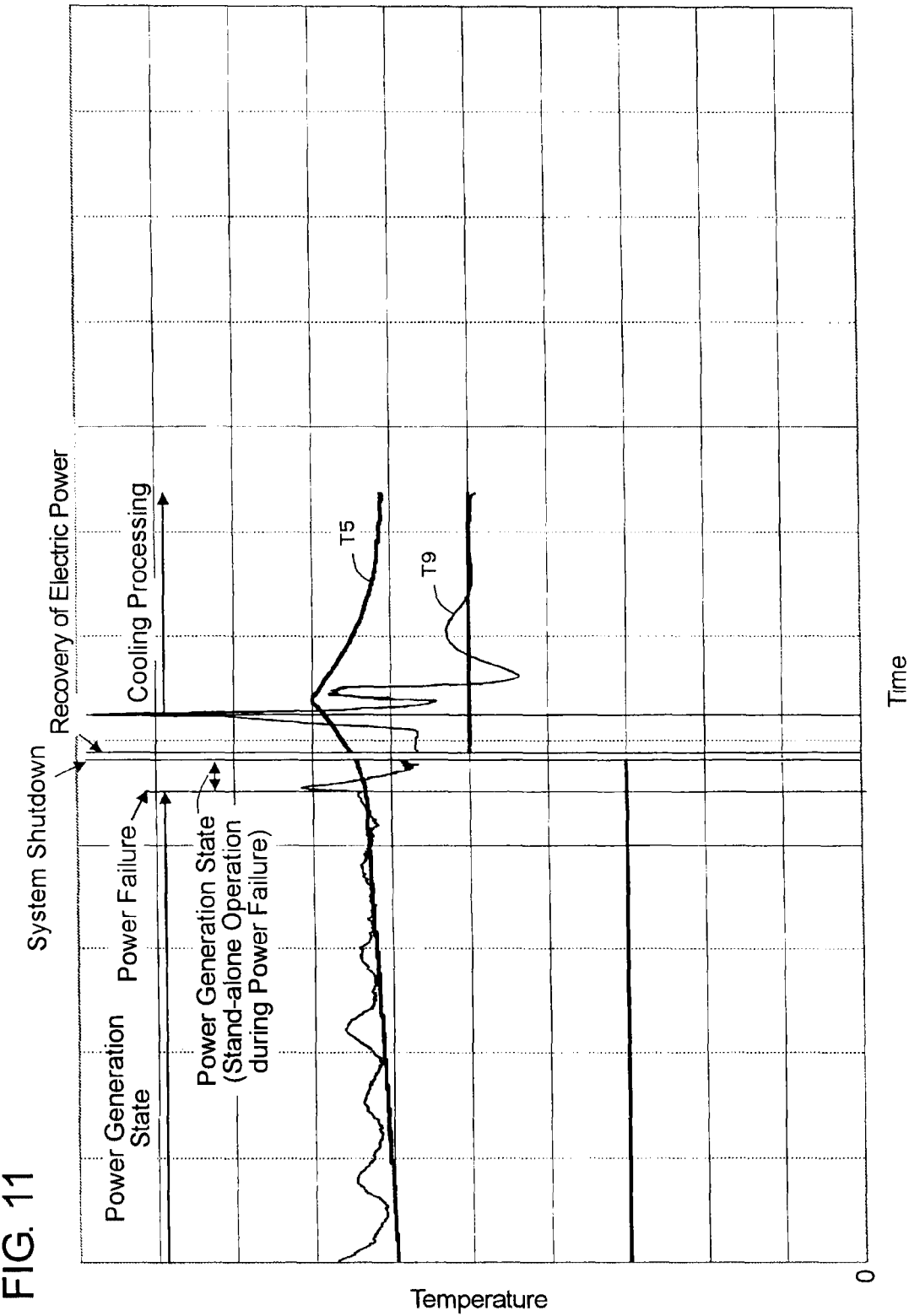
FIG. 11 is a time chart showing the transitions of a heat exchanger inlet temperature (T9) of condensing refrigerant and an outer wall surface temperature (T5) of a burner section 25 under the cooling processing according to the present invention.
Figure 12:
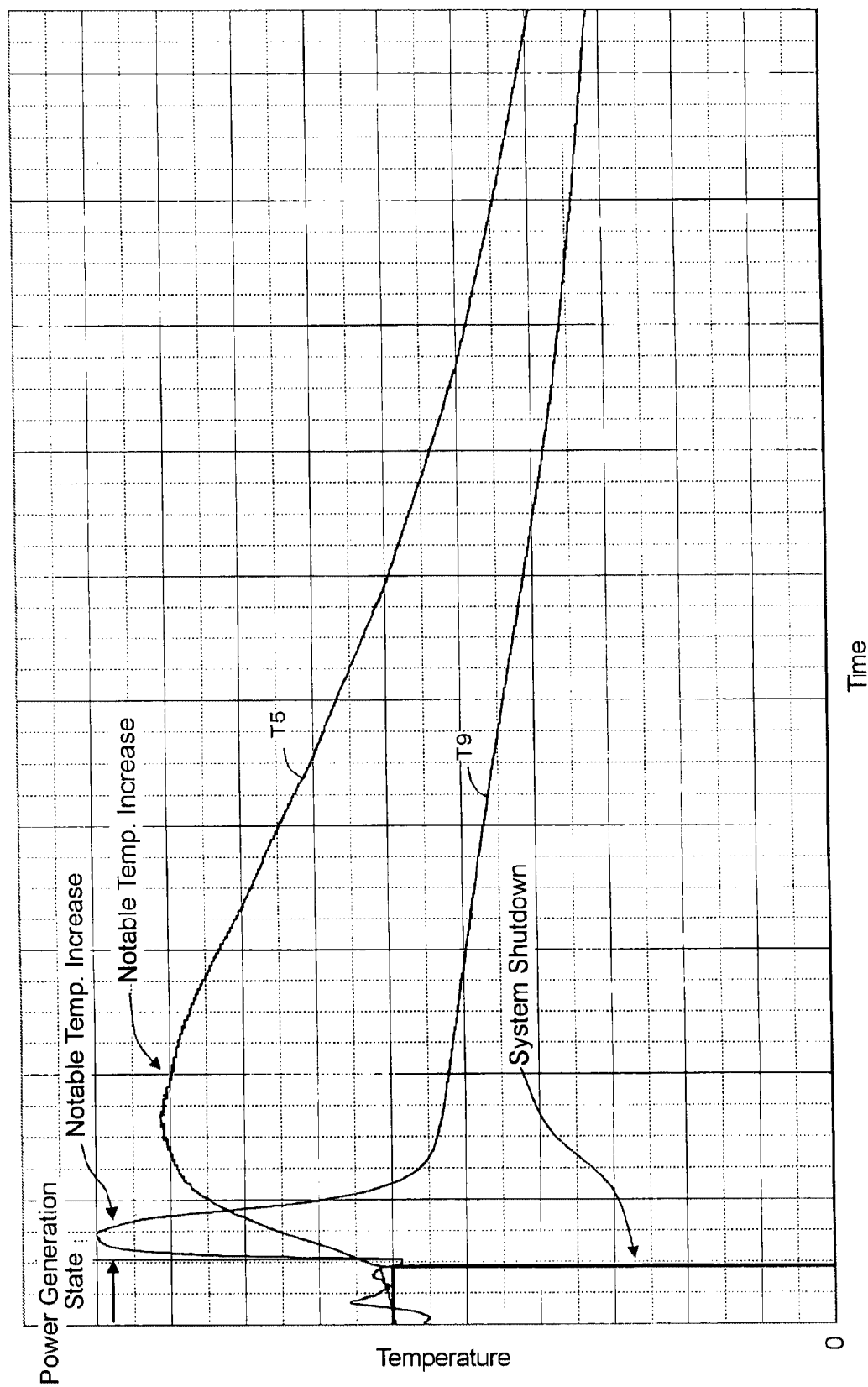
FIG. 12 is a time chart showing the transitions of the heat exchanger inlet temperature (T9) of condensing refrigerant and the outer wall surface temperature (T5) of the burner section 25 in the case that upon occurrence of a power failure, the normal stopping processing is not performed without execution of the cooling processing according to the present invention.

Further, the effect of the cooling processing will be described with reference to time charts shown in FIGS. 9 through 12. FIGS. 9 and 11 show the transitions of the wall around temperature (T1) of the reforming section 21, the heat exchanger inlet temperature (T9) of the condensing refrigerant and the external wall surface temperature (T5) of the burner section 25. FIGS. 10 and 12 show the transitions of the wall around temperature (T1) of the reforming section 21, the heat exchanger inlet temperature (T9) of the condensing refrigerant and the external wall surface temperature (T5) of the burner section 25 in the case that the cooling processing is not performed because the normal stop processing is not executed due to the occurrence of a power failure.

As shown in FIG. 9, it is found that by cooling the burner section 25 through the driving of the combustion air pump 52a, the wall around temperature (T1) reaches to the normally ignitable temperature (200° C. or lower) within 40 minutes or so following the recovery of electric power. On the contrary, if the cooling processing is not executed, as shown in FIG. 10, two hours or longer following the system shutdown (the recovery of electric power) is taken for the wall around temperature (T1) to reach the normally ignitable temperature (200° C. or lower). As apparent from these, it is found that the time period taken to reach the normally ignitable temperature following the recovery of electric power can be shortened by the cooling processing.

Further, as shown in FIG. 11, the heat exchanger inlet temperature (T9) of the condensing refrigerant is lowered in the course of temperature increase by cooling the reserved hot water line through the driving of the reserved hot water circulation pump 62a, the FC cooling water circulation pump 63a and the condensing refrigerant circulation pump 65a. On the contrary, where the cooling processing is not executed, as shown in FIG. 12, the heat exchanger inlet temperature (T9) of the condensing refrigerant rises following the system shutdown, reaches the peak (100° C.) within fifteen minutes or so and is lowered to about 60° C. within the subsequent fifteen minutes. As apparent from these, it is found that the temperature increase of the condensing refrigerant following the system shutdown is avoided by the cooling of the reserved hot water line.

Further, as shown in FIG. 11, the external wall surface temperature (T5) of the burner section 25 is lowered in the course of temperature increase by cooling the burner section 25 through the driving of the combustion air pump 52a. On the contrary, where the cooling processing is not executed, as shown in FIG. 12, the external wall surface temperature (T5) of the burner section 25 rises following a system shutdown, reaches the peak (90° C.) within the subsequent one hour or so and goes downs in due course. As apparent from these, it is found that the temperature increase of the burner section following the system shutdown is avoided by the cooling processing.

6-4) Pressure Regulation Processing for Reforming Apparatus and Fuel Cell in Recovery Operation When the burner section temperature T5 becomes the normally ignitable temperature through the cooling processing, the system controller 40 executes the pressure regulation processing. The system controller 40 makes judgments of "YES" respectively at steps 316 and 318 if the pressure (P1) at the reforming apparatus outlet of the reformed gas and the pressure (P2) at the fuel cell inlet of the reformed gas which temperatures are respectively detected by the pressure sensors 45b, 45c are within a proper range (the range from −20 kPa to 8 kPa), and without performing pressure regulations being unnecessary, stops the recovery operation and cancels the error indicating the occurrence of the power failure (step 320), whereby the fuel cell system is brought into the standby state (not into the post-power failure standby state but into a usual standby state) to become the restartable state (step 322). When this state is reached, the restart becomes possible in response to a start command given by the user. The restart may be carried out in an automatic operation.

In this case, the recovery operation stopped means the operations relating to the cooling processing and includes the driving of the reserved hot water circulation pump 62a, the FC cooling water circulation pump 63a, the condensing refrigerant circulation pump 65a, the combustion air pump 52a and the ventilation fan 1b.

If at least either one of the pressure (P1) at the reforming apparatus outlet of the reformed gas and the pressure (P2) at the fuel cell inlet of the reformed gas is higher than the proper range, a judgment of "NO" is made at step 316, and a pressure reducing processing is executed (step 324).

If the pressure (P1) at the reforming apparatus outlet of the reformed gas is high, that is, if the internal pressure (P1) of the reforming apparatus 20 is high because of being sealed as a result that the unreformed fuel valve 41d, the reforming water valve 43c, the oxidizing air valve 46b, the first reformed gas valve 45a and the second reformed gas valve 48a are held in the closed state, the second reformed gas valve 48a is brought into the open state. Thus, the high pressure in the reforming apparatus 20 is led to the outside through the second reformed gas valve 48a and further through the burner section 25 and is reduced (step 324). At this time, the second reformed gas valve 48a is preferred to be placed under PWM control, wherein it is preferred that the pressure (P1) is regulated to the proper range as it is observed. Instead, the opening degree may be controlled.

Further, if the pressure (P2) at the fuel cell inlet of the reformed gas is high, that is, if the internal pressure (P2) of the fuel cell 10 (the fuel electrode 11) is high because of being sealed as a result that the fuel valve 54a, the first reformed gas valve 45a and the offgas valve 47a are held in the closed state, the offgas valve 47a is brought into the open state. Thus, the high pressure in the fuel cell 10 (the fuel electrode 11) is led to the outside through the offgas valve 47a and further through the burner section 25 and is reduced (step 324). At this time, the offgas valve 47a is preferred to be placed under PWM control, wherein it is preferred that the pressure (P2) is regulated to the proper range as it is observed. Instead, the opening degree may be controlled.

If at least either one of the pressure (P1) at the reforming apparatus outlet of the reformed gas and the pressure (P2) at the fuel cell inlet of the reformed gas is lower than the proper range, a judgment of "NO" is made at step 318, and a pressure increase processing is executed (step 326).

If the pressure (P1) at the reforming apparatus outlet of the reformed gas is low (negative pressure) (if the internal pressure (P1) of the reforming apparatus 20 being sealed as aforementioned is low), the fuel valve 41a and the unreformed fuel valve 41d are brought into the open state. Thus, unreformed fuel is flown into the reforming apparatus 20 being at a negative pressure, and the pressure is increased (step 326). At this time, it is preferred that the fuel valve 41a is held in the open state and that the unreformed fuel valve 41d is placed under PWM control wherein the pressure (P1) is regulated to the proper range as it is observed. Instead, the opening degree may be controlled. In the pressure increase processing, the pump (41b) may be operated to increase the pressure.

Further, the pressure (P2) at the fuel cell inlet of the reformed gas is low (if being a negative pressure) (if the internal pressure (P2) of the fuel cell 10 being sealed as aforementioned is low), the fuel valve 41a and the fuel valve 54a are brought into the open state. Thus, unreformed fuel is flown into the fuel cell 10 being at a negative pressure, and the pressure is increased (step 326). At this time, it is preferred that the fuel valve 41a is held in the open state and that the fuel valve 54a is placed under PWM control wherein the pressure (P2) is regulated to the proper range as it is observed. Instead, the opening degree may be controlled.

The system controller 40 closes the valves which have been held in the open state until then, if the pressures go within the proper range.

Figure 13:
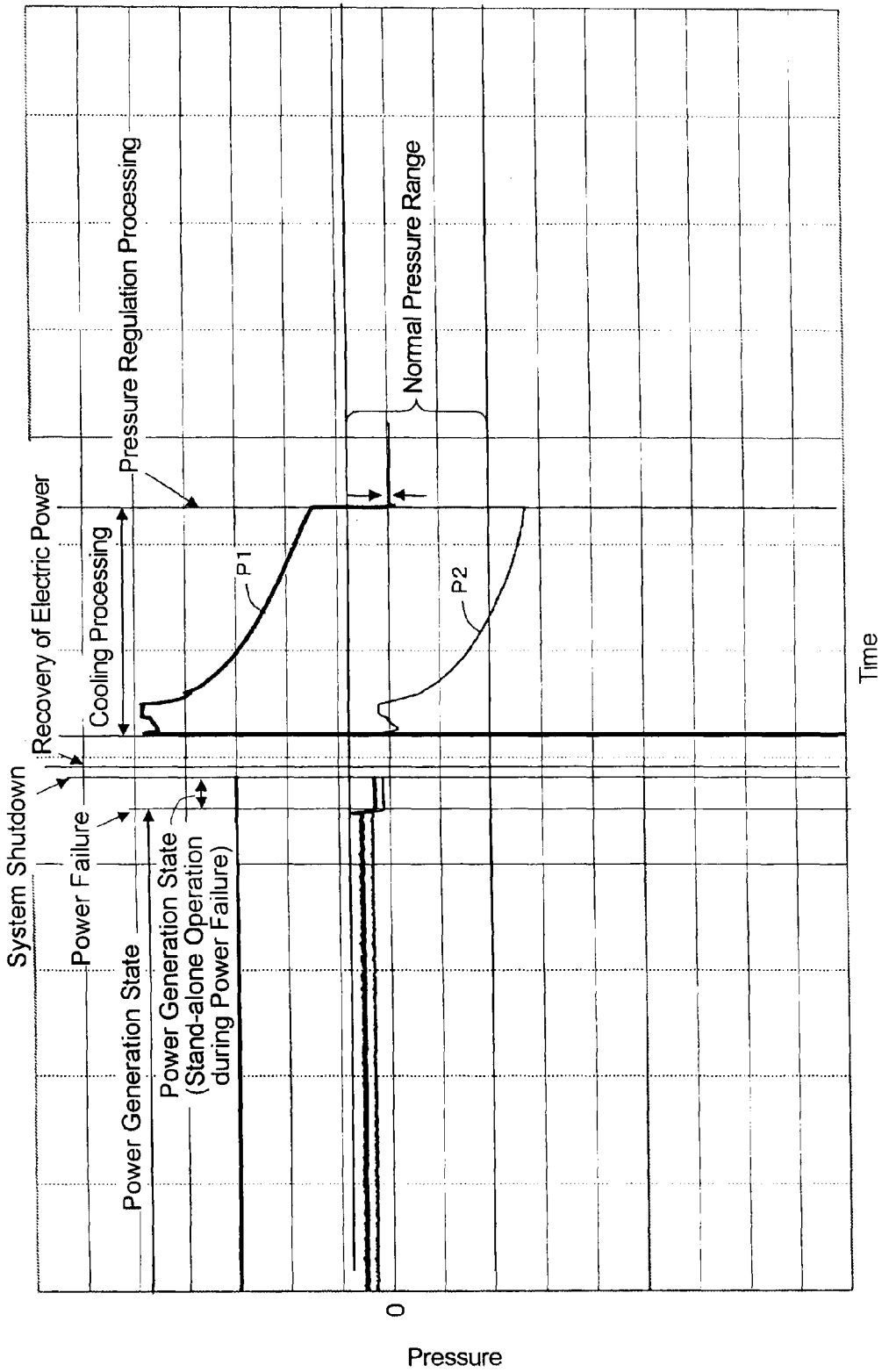
FIG. 13 is a time chart showing the transitions of a pressure (P1) at a reforming apparatus outlet of reformed gas and a pressure (P2) at a fuel cell inlet of reformed gas under a pressure regulation processing according to the present invention.
Figure 14:
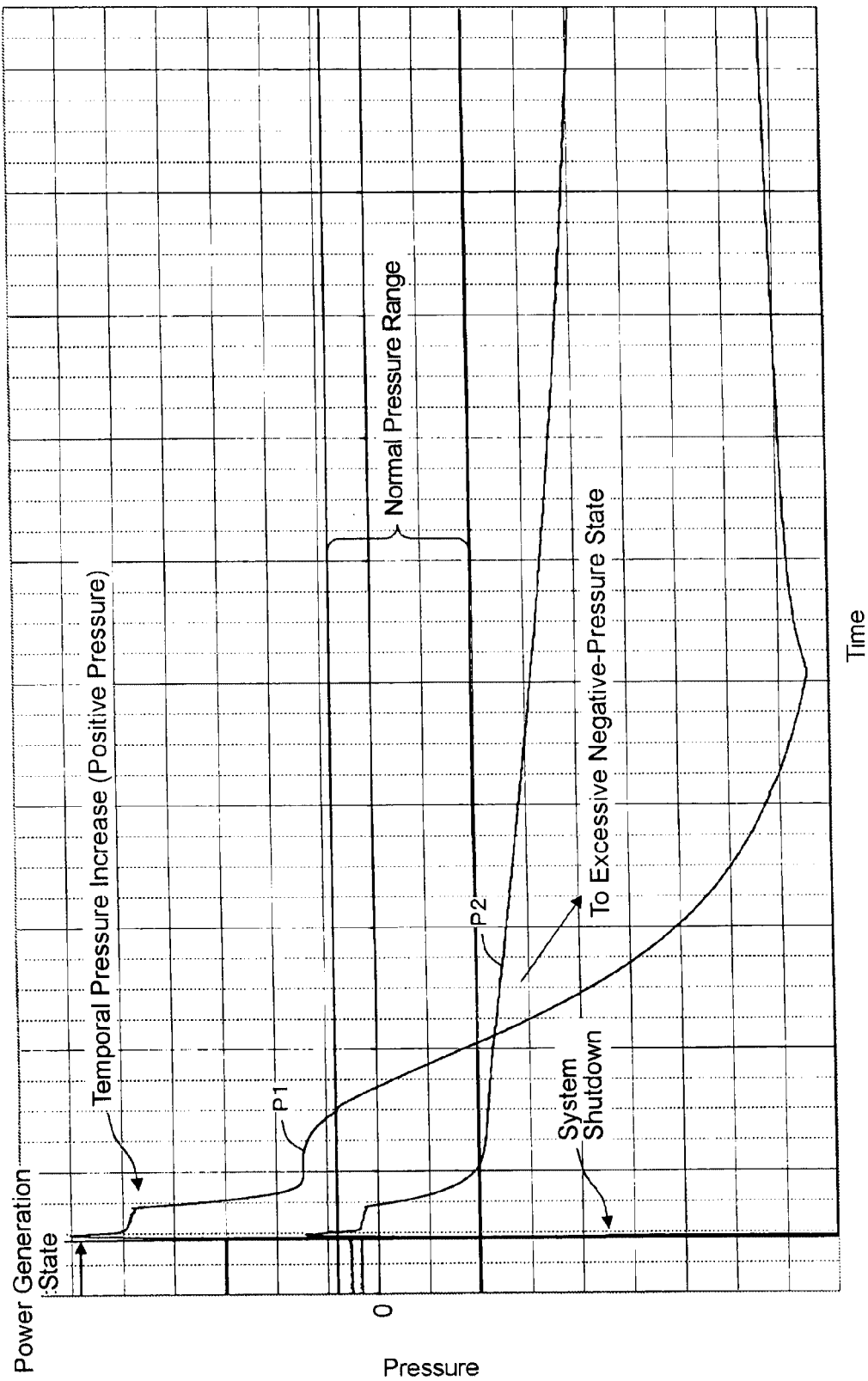
FIG. 14 is a time chart showing the transitions of the pressure (P1) at the reforming apparatus outlet of reformed gas and the pressure (P2) at the fuel cell inlet of reformed gas in the case that upon occurrence of a power failure, the normal stopping processing is not performed without execution of the pressure regulation processing according to the present invention.

Further, the effect of the pressure regulation processing will be described with reference to time charts shown in FIGS. 13 and 14. FIG. 13 shows the transitions of the pressure (P1) at the reforming apparatus outlet of the reformed gas and the pressure (P2) at the fuel cell inlet of the reformed gas. FIG. 14 shows the transitions of the pressure (P1) at the reforming apparatus outlet of the reformed gas and the pressure (P2) at the fuel cell inlet of the reformed gas in the case that the pressure regulation processing is not performed because the normal stop processing is not executed due to the occurrence of a power failure.

As shown in FIG. 13, at the time when the wall around temperature (T1) reaches the normally ignitable temperature (200° C. or lower) as a result that the burner section 25 is cooled through the driving of the combustion air pump 52b, the reforming apparatus pressure P1 is 16 kPa (>8 kPa), and the fuel cell pressure P2 is −27 kPa (<−20 kPa). FIGS. 9 and 13 (also FIG. 11) show related data (their axes of abscissas are in agreement), and the vertical line indicated by the arrow representing the pressure regulation processing shown in FIG. 13 is in alignment with the vertical line pointing the time when T1 in FIG. 9 has been lowered, wherein T1 has become 200° C. Accordingly, the reforming apparatus pressure P1 changes form 16 kPa to about 0 kPa by the depressurization, whereas the fuel cell pressure P2 changes from −27 kPa to about 0 kPa by the cancellation of the negative pressure, whereby either pressure can be regulated to the proper pressure range. On the contrary, if the pressure regulation is not performed, as shown in FIG. 14, a high pressure state is maintained for the period of 30 minutes or so subsequent to the system shutdown, wherein particularly, the reforming apparatus pressure P1 indicates a higher pressure value than the normal pressure range. After that, with the temperature in the system going down, the both of the pressures go down and become strong negative pressure states beyond the normal pressure range (the negative pressure of P1: a pressure to be drawn into the reforming apparatus, the negative pressure of P2: a pressure to be drawn into the stacks). The continuation of the strong negative pressure states would cause abnormalities such as the fault of each valve (adherence in the closed state). As understood from these facts, since the cooling processing serves to suppress an abrupt increase of the temperature in the system, it is possible to suppress increases of the reforming apparatus pressure P1 and the fuel cell pressure P2 and to maintain, upon termination of the cooling processing, the pressures at the time of such termination within the proper range (normal pressure range).

Accordingly, by the recovery operation as constructed above, even if the normal stop processing is not executed due to a power failure, the cooling and the pressure regulation in the system can be carried out after the recovery of electric power as a checking is done for a possibility of a normal ignition. Thus, it becomes possible to control the deterioration and fault of the system to the minimum and, at the same time, to make the maintenance by the human work unnecessary. Further, since the recovery operation and the restart automatically become possible upon the recovery of electric power subsequent to the power failure, the practical use by the user can be enhanced. Further, it is also possible to move the fuel cell system to the standby state upon completion of the recovery operation.

It is to be noted that the controller described in the claims is constituted by at least either one of the foregoing system controller 40 and inverter controller 31d.

As is clear from the foregoing description, in the present embodiment, when having been unable to normally stop the fuel cell system at the time of the system power source 33 being abnormal (at the time of a power failure), the controller automatically executes the recovery operation so that that the fuel cell system is brought into the restartable state, and moves the fuel cell system into the standby state upon completion of the recovery operation (flow charts shown in FIGS. 5 through 8). Thus, where the fuel cell system was not normally stopped in the event of the system power source 33 being abnormal (at the time of a power failure), even if unusually high temperatures last at predetermined places in the fuel cell system (in the present embodiment, the respective places detected by the respective temperature sensors 21c, 26a, 23c, 24b, 25a, 62b, 63b, 63c, 65b, 71) or even if places in an improper pressure state occur, the fuel cell system is automatically recovered to be brought into the restartable state and is moved to the standby state upon completion of the recovery (step 32). Thus, at the time of a subsequent restart, it is possible to normally restart the fuel cell system without a need for maintenance by human.

By the way, in the fuel cell system described in the foregoing Patent Document 1, in the case of occurrence of a power failure, the fuel cell system is moved to a stopping stage and is stopped through predetermined stopping steps without account of fluctuations in the pressures and temperatures in the fuel cell system, and as a result, unusually high temperatures last at predetermined places in the fuel system or places in a pressure state beyond a proper range occur, so that the system is, as a whole, liable to be deteriorated in performance and durability and hence, to be lowered in reliability.

In the present embodiment, on the contrary, the reforming apparatus 20 is provided with the reforming section 21 for reforming unreformed fuel to generate reformed fuel gas and the burner section 25 supplied with combustible gas and combustion oxidizer gas for combusting the combustible gas with the combustion oxidizer gas to heat the reforming section with the combustion gas, and the recovery operation includes the cooling processing (step 310) for the burner section 25 and the heat medium circulation circuits (the circulation circuits composed of the reserved hot water circulation circuit 62, the FC cooling water circulation circuit 63 and the condensing refrigerant circulation circuit 65) and the pressure regulation processing (steps 324, 326) for the respective interiors of the reforming apparatus 20 and the fuel cell 10. With this configuration, even if an unusually high temperature occurs to last at predetermined places in the fuel cell system or places in an improper pressure state occur in the case that the fuel cell system was not normally stopped due to the occurrence of a power failure in the system power source 33, the cooling processing can suppress the high temperature and the pressure regulation processing can prevent the pressure becoming improper, so that the system can as a whole be restrained from deteriorating in performance and durability and can be maintained high in reliability.

Further, the pressure regulation processing is executed upon completion of the cooling processing. Thus, since the pressure regulations in the interiors of the reforming apparatus 20 and the fuel cell 10 are carried out after the burner section 25 of the reforming apparatus has gone down in temperature, any accidental ignition can be prevented even if the combustible gases such as unreformed fuel and fuel gas in the interiors flow as a result of the pressure regulation.

Further, the fuel cell system is further provided with the first heat medium circulation circuit (the condensing refrigerant circulation circuit) 65 through which the first heat medium (condensing refrigerant) for collecting the waste heat from the reforming apparatus 20 circulates, and the first heat medium circulation means (the condensing refrigerant circulation pump) 65a for circulating the first heat medium, the waste heat from the reforming apparatus 20 also includes the waste heat of the exhaust gas from the burner section 25, and the cooling processing is the processing for flowing combustion oxidizer gas only into the burner section 25 after the circulation operation of the first heat medium by the first heat medium circulation means is started. Thus, since, when the first heat medium collects the waste heat of the exhaust gas from the burner section 25 in connection with the cooling of the burner section 25 through circulation of the combustion oxidizer gas, the waste heat of the exhaust gas can be collected by the first heat medium having been already circulating, the first heat medium can be prevented from being boiled with the waste heat of the exhaust gas, so that the recovery operation can be performed normally.

Further, during the recovery operation, the controller detects an abnormality in the fuel cell system including at least one of faults of the sensors (the gas sensors, the temperature sensors and the pressure sensors all aforementioned) provided in the fuel cell system, leaks of unreformed fuel, combustible gas and fuel gas, a fire in the fuel cell system and an unusually high temperature in the fuel cell system, and upon detection of the abnormality, inhibits the restart of the fuel cell system. Thus, it is possible to restore the system normally in the recovery operation.

Further, when the temperature at a predetermined place in the fuel cell system rises higher than a predetermined temperature, the controller judges the occurrence of an unusually high temperature if the high temperature state lasts for the predetermined time period or longer. Thus, it is possible to suppress an erroneous detection regarding an unusually high temperature at the time of a normal operation.

Figure 15:
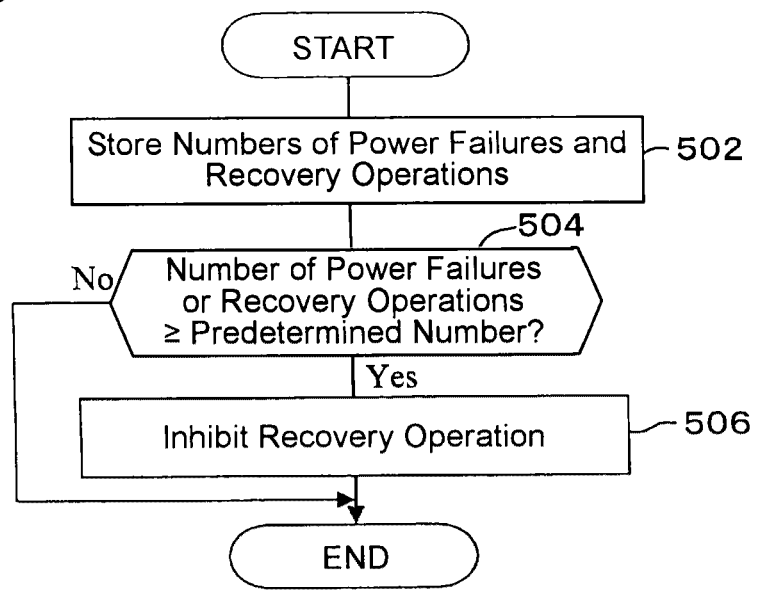
FIG. 15 is a flow chart of a control program executed by the controller shown in FIG. 1.

Further, in accordance with the flow chart shown in FIG. 15, the system controller 40 may store the number of the stopping operations having been executed due to power failures of the system power source 33 and the number of recovery operations having been executed from the power failures (step 502) and may inhibit a further recovery operations from a presently occurring power failure and subsequent power failures (step 506) if either of the numbers reaches a predetermined number (by making a judgment of "YES" at step 504). Thus, the executions of further recovery operations and further restarts which are unreasonable or useless can be suppressed, so that it is possible to restore the system normally.

INDUSTRIAL APPLICABILITY

As described above, a reforming apparatus according to the present invention is suitable for being able to be restarted normally without the need for human labor in a restart operation subsequent to a power failure.

DESCRIPTION OF REFERENCE SYMBOLS

10 . . . fuel cell, 20 . . . reforming apparatus, 21 . . . reforming section, 22 . . . cooler section, 23 . . . CO shift section, 24 . . . CO selective oxidizing section, 25 . . . burner section, 26 . . . evaporator section, 30 . . . inverter system, 31 . . . inverter unit, 31a . . . DC/DC converter, 31b . . . DC/AC inverter, 31c . . . inverter power supply DC/DC converter, 31d . . . inverter controller (controller), 32 . . . rectifier circuit, 33 . . . system power source, 35 . . . external power loads, 37, 39 . . . first and second accessories, 40 . . . system controller (controller), 60 . . . waste heat collection system, 61 . . . reserved hot water tank, 62 . . . reserved hot water circulation circuit, 63 . . . FC cooling water circulation circuit, 64 . . . second heater exchanger, 65 . . . condensing refrigerant circulation circuit (first heat medium circulation circuit), 65a . . . condensing refrigerant circulation pump (first heat medium circulation means), 66 . . . first heat exchanger

The invention claimed is:

1. A fuel cell system comprising:
a fuel cell that supplies generated electric power to external power loads connected to a system power source;
a reforming apparatus that supplies fuel gas generated by reforming unreformed fuel to the fuel cell, the reforming apparatus including a reforming section that generates fuel gas from unreformed fuel and a burner section supplied with combustible gas and combustion oxidizer gas that combusts the combustible gas with the combustion oxidizer gas to heat the reforming section with combustion gas; and
a controller programmed to control operations of the fuel cell and the reforming apparatus, the controller being programmed to execute a recovery operation, when the fuel cell system is unable to be stopped at a time that the system power source is abnormal, so that the fuel cell system is brought into a restartable state, and upon completion of the recovery operation, the controller is programmed to bring the fuel cell system into a standby state, wherein the recovery operation includes a cooling processing of the burner section and a pressure regulation processing of respective interiors of the reforming apparatus and the fuel cell.

2. The fuel cell system as set forth in claim 1, wherein the pressure regulation processing is executed upon completion of the cooling processing.

3. The fuel cell system as set forth in claim 1, wherein:
the fuel cell system is further provided with a first heat medium circulation circuit through which first heat medium to collect waste heat of the reforming apparatus circulates, and first heat medium circulation means for circulating the first heat medium;
the waste heat of the reforming apparatus also includes waste heat of exhaust gas from the burner section; and
the cooling processing is a processing that flows the combustion oxidizer gas only into the burner section after the circulation operation of the first heat medium by the first heat medium circulation means is started.

4. The fuel cell system as set forth in claim 1, wherein during the recovery operation, the controller detects an abnormality in the fuel cell system including at least one of faults of sensors provided in the fuel cell system, leaks of unreformed fuel, combustible gas and fuel gas, a fire in the fuel cell system and an unusually high temperature in the fuel cell system, and upon detection of the abnormality, inhibits the restart of the fuel cell system.

5. The fuel cell system as set forth in claim 4, wherein when the temperature at a predetermined place in the fuel cell system rises higher than a predetermined temperature, the controller judges the occurrence of an unusually high temperature if the high temperature states lasts for a predetermined time period or longer.

6. The fuel cell system as set forth in claim 1, wherein the controller stores the number of stopping operations having been executed due to abnormalities of the system power source and the number of recovery operations having been executed from the abnormalities and inhibits a recovery operation from a presently occurring abnormality if either of the numbers reaches a predetermined number.

7. The fuel cell system as set forth in claim 1, further comprising:
a combustion air pump that pumps the combustion oxidizer gas,
wherein the cooling processing of the burner section includes controlling the combustion air pump to flow the combustion oxidizer gas to cool the burner section.

8. The fuel cell system as set forth in claim 7, further comprising:
a first heat medium circulation circuit through which first heat medium to collect waste heat of the reforming apparatus circulates, and first heat medium circulation means for circulating the first heat medium,
wherein the waste heat of the reforming apparatus also includes waste heat of exhaust gas from the burner section, and
wherein the cooling processing of the burner section includes controlling the air pump to flow the combustion oxidizer gas only into the burner section after the circulation operation of the first heat medium by the first heat medium circulation means is started.

9. The fuel cell system as set forth in claim 1, wherein the controller initiates the cooling processing of the burner section when a temperature of the burner section is greater than 200° C.

10. The fuel cell system as set forth in claim 9, wherein:
the cooling processing of the burner section is complete when the temperature of the burner section is equal to or less than 200° C., and
the pressure regulation processing is executed upon completion of the cooling processing.

* * * * *